United States Patent Office 3,300,483
Patented Jan. 24, 1967

3,300,483
4,6-PREGNADIENO-[3,2-c]PYRAZOLES AND PROCESSES OF PREPARING THEM
Max Tishler, Westfield, N.J., Nathan G. Steinberg, Brooklyn, N.Y., and Ralph F. Hirschmann, Scotch Plains, N.J., assignors to Merck & Co., Inc., Rahway, N.J., a corporation of New Jersey
No Drawing. Original application Dec. 1, 1961, Ser. No. 156,478, now Patent No. 3,067,194, dated Dec. 4, 1962. Divided and this application July 2, 1962, Ser. No. 207,079
1 Claim. (Cl. 260—239.5)

This invention is concerned generally with novel 4,6-pregnadieno-[3,2-c]pyrazole compounds, and with processes of preparing the same. More particularly, it relates to novel 21-hydroxy-, 21-acyloxy-, 21-desoxy-, and 21-fluoro-17α-hydroxy - 20 - oxo - 4,6 - pregnadieno-[3,2-c] pyrazole compounds and to processes of preparing these compounds starting from the corresponding 17α,21-dihydroxy-4,6-pregnadiene-3,20-dione.

This application is a division of co-pending application Serial No. 156,478, filed December 1, 1961, now U.S. Patent No. 3,067,194, which application is, in turn, a continuation-in-part of application Serial No. 67,172, filed November 4, 1960, now abandoned.

These novel 4,6-pregnadieno-[3,2-c]pyrazole compounds, subject of the present invention, may be chemically represented by structures A and B:

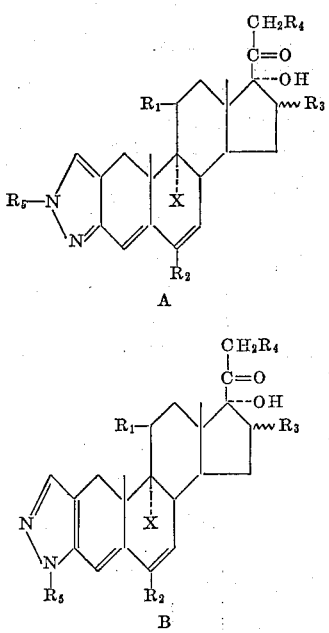

wherein $R_1$ is β-halogen, β-hydroxy or keto, but β-halogen is present at $R_1$ only when X is halogen, $R_2$ is fluoro, hydrogen or methyl, $R_3$ is hydrogen, α-methyl, β-methyl or methylene, $R_4$ is hydrogen, hydroxy, acyloxy or fluoro, $R_5$ is hydrogen, alkyl, cycloalkyl, aralkyl, aryl or acyl and X is hydrogen or halogen, and wherein any acyl group present as an acyloxy group at $R_4$ may be the same or different from any acyl group present at $R_5$. N-substituted-pyrazole compounds having structure A are herein designated as the 1'-substituted-4,6-pregnadieno-[3,2-c] pyrazoles, and N-substituted-pyrazole compounds having structure B are designated as the 2'-substituted-4,6-pregnadieno-[3,2-c]pyrazoles.

The above defined 4,6-pregnadieno-[3,2-c]pyrazoles produced in accordance with the present invention possess high anti-inflammatory activity, and are especially effective for the treatment of arthritis and related diseases since they can be administered for their cortisone-like action in low dosage thereby minimizing undesirable side effects.

In preparing our novel chemical compounds, the starting material utilized is a 17α,21-dihydroxy-4,6-pregnadiene-3,20-dione which may be identified by the following structural formula:

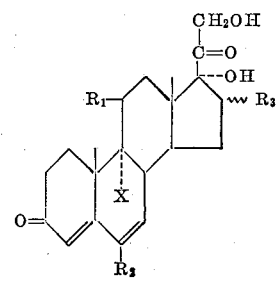

wherein $R_1$ is β-hydroxy or β-halogen, but β-halogen is present at $R_1$ only when X is halogen, $R_2$ is hydrogen, fluoro or methyl, $R_3$ is hydrogen, α-methyl, β-methyl or methylene, and X is hydrogen or halogen. However, it is clear to those skilled in the art that other starting materials may be similarly converted to the desired end products.

Among the compounds which may be used as a starting material in the process of our invention are:

11β,17α,21-trihydroxy-4,6-pregnadiene-3,20-dione,
11β,17α,21-trihydroxy-16α-methyl-4,6-pregnadiene-3,20-dione,
11β,17α,21-trihydroxy-16β-methyl-4,6-pregnadiene-3,20-dione,
11β,17α,21-trihydroxy-16-methylene-4,6-pregnadiene-3,20-dione,
11β,17α,21-trihydroxy-6-methyl-4,6-pregnadiene-3,20-dione,
11β,17α,21-trihydroxy-6,16α-dimethyl-4,6-pregnadiene-3,20-dione,
11β,17α,21-trihydroxy-6,16β-dimethyl-4,6-pregnadiene-3,20-dione,
11β,17α,21-trihydroxy-6-methyl-16-methylene-4,6-pregnadiene-3,20-dione,
6-fluoro-11β,17α,21-trihydroxy-4,6-pregnadiene-3,20-dione,
6-fluoro-11β,17α,21-trihydroxy-16α-methyl-4,6-pregnadiene-3,20-dione,
6-fluoro-11β,17α,21-trihydroxy-16β-methyl-4,6-pregnadiene-3,20-dione,
6-fluoro-11β,17α,21-trihydroxy-16-methylene-4,6-pregnadiene-3,20-dione,
9α-fluoro-11β,17α,21-trihydroxy-4,6-pregnadiene-3,20-dione,
9α-fluoro-11β,17α,21-trihydroxy-16α-methyl-4,6-pregnadiene-3,20-dione,
9α-fluoro-11β,17α,21-trihydroxy-16β-methyl-4,6-pregnadiene-3,20-dione,
9α-fluoro-11β,17α,21-trihydroxy-16-methylene-4,6-pregnadiene-3,20-dione, 9α-chloro-11β,17α,21-trihydroxy-4,6-pregnadiene-
3,20-dione,
9α-chloro-11β,17α,21-trihydroxy-16α-methyl-4,6-
pregnadiene-3,20-dione,
9α-chloro-11β,17α,21-trihydroxy-16β-methyl-4,6-
pregnadiene-3,20-dione,
9α-chloro-11β,17α,21-trihydroxy-16-methylene-4,6-
pregnadiene-3,20-dione,
9α-fluoro-11β,17α,21-trihydroxy-6-methyl-4,6-pregna-
diene-3,20-dione,
9α-fluoro-11β,17α,21-trihydroxy-6,16α-dimethyl-4,6-
pregnadiene-3,20-dione,
9α-fluoro-11β,17α,21-trihydroxy-6,16β-dimethyl-4,6-
pregnadiene-3,20-dione,
9α-fluoro-11β,17α,21-trihydroxy-6-methyl-16-methylene-
4,6-pregnadiene-3,20-dione,
9α-chloro-11β,17α,21-trihydroxy-6-methyl-4,6-pregna-
diene-3,20-dione,
9α-chloro-11β,17α,21-trihydroxy-6,16α-dimethyl-4,6-
pregnadiene-3,20-dione,
9α-chloro-11β,17α,21-trihydroxy-6,16β-dimethyl-4,6-
pregnadiene-3,20-dione,
9α-chloro-11β,17α,21-trihydroxy-6-methyl-16-methylene-
4,6-pregnadiene-3,20-dione,
9α-chloro-11β,17α,21-trihydroxy-6-fluoro-4,6-pregna-
diene-3,20-dione,
6,9α-difluoro-11β,17α,21-trihydroxy-4,6-pregnadiene-
3,20-dione,
6,9α-difluoro-11β,17α,21-trihydroxy-16α-methyl-4,6-
pregnadiene-3,20-dione,
6,9α-difluoro-11β,17α,21-trihydroxy-16β-methyl-4,6-
pregnadiene-3,20-dione,
6,9α-difluoro-11β,17α,21-trihydroxy-16-methylene-4,6-
pregnadiene-3,20-dione,
9α-chloro-6-fluoro-11β,17α,21-trihydroxy-4,6-pregna-
diene-3,20-dione,
9α-chloro-6-fluoro-11β,17α,21-trihydroxy-16α-methyl-
4,6-pregnadiene-3,20-dione,
9α-chloro-6-fluoro-11β,17α,21-trihydroxy-16β-methyl-
4,6-pregnadiene-3,20-dione,
9α-chloro-6-fluoro-11β,17α,21-trihydroxy-16-methylene-
4,6-pregnadiene-3,20-dione, and the 11-keto-analogues of the above compounds;

9α,11β-dichloro-17α,21-dihydroxy-4,6-pregnadiene-
3,20-dione,
9α,11β-dichloro-17α,21-dihydroxy-16α-methyl-4,6-
pregnadiene-3,20-dione,
9α,11β-dichloro-17α,21-dihydroxy-16β-methyl-4,6-
pregnadiene-3,20-dione,
9α,11β-dichloro-17α,21-dihydroxy-16-methylene-4,6-
pregnadiene-3,20-dione,
9α,11β-dichloro-6-fluoro-17α,21-dihydroxy-4,6-pregna-
diene-3,20-dione,
9α,11β-dichloro-6-fluoro-17α,21-dihydroxy-16α-methyl-
4,6-pregnadiene-3,20-dione,
9α,11β-dichloro-6-fluoro-17α,21-dihydroxy-16β-methyl-
4,6-pregnadiene-3,20-dione,
9α,11β-dichloro-6-fluoro-17α,21-dihydroxy-16-
methylene-4,6-pregnadiene-3,20-dione,
9α,11β-dichloro-17α,21-dihydroxy-6-methyl-4,6-
pregnadiene-3,20-dione,
9α,11β-dichloro-17α,21-dihydroxy-6,16α-dimethyl-
4,6-pregnadiene-3,20-dione,
9α,11β-dichloro-17α,21-dihydroxy-6,16β-dimethyl-
4,6-pregnadiene-3,20-dione,
9α,11β-dichloro-17α,21-dihydroxy-6-methyl-16-
methylene-4,6-pregnadiene-3,20-dione,
9α-bromo-11β-chloro-17α,21-dihydroxy-4,6-pregna-
diene-3,20-dione,
9α-bromo-11β-chloro-17α,21-dihydroxy-16α-methyl-
4,6-pregnadiene-3,20-dione,
9α-bromo-11β-chloro-17α,21-dihydroxy-16β-methyl-
4,6-pregnadiene-3,20-dione,
9α-bromo-11β-chloro-17α,21-dihydroxy-16-methylene-
4,6-pregnadiene-3,20-dione,
9α-bromo-11β-chloro-17α,21-dihydroxy-6-fluoro-4,6-
pregnadiene-3,20-dione,
9α-bromo-11β-chloro-17α,21-dihydroxy-6-fluoro-16α-
methyl-4,6-pregnadiene-3,20-dione,
9α-bromo-11β-chloro-17α,21-dihydroxy-6-fluoro-16β-
methyl-4,6-pregnadiene-3,20-dione,
9α-bromo-11β-chloro-17α,21-dihydroxy-6-fluoro-16-
methylene-4,6-pregnadiene-3,20-dione,
9α-bromo-11β-chloro-17α,21-dihydroxy-6-methyl-4,6-
pregnadiene-3,20-dione,
9α-bromo-11β-chloro-17α,21-dihydroxy-6,16α-dimethyl-
4,6-pregnadiene-3,20-dione,
9α-bromo-11β-chloro-17α,21-dihydroxy-6,16β-dimethyl-
4,6-pregnadiene-3,20-dione,
9α-bromo-11β-chloro-17α,21-dihydroxy-6-methyl-16-
methylene-4,6-pregnadiene-3,20-dione and the like.

The above named starting materials for our invention can be prepared by the introduction of the various substituents, namely the 16α-methyl-, 16β-methyl-, 16-methylene-, 6α-methyl-, 6α-fluoro-, 9α-fluoro or the 9α-chloro groups into a 17α,21-dihydroxy-4-pregnene-3,20-dione according to known procedures capable of general application. More than one substituent may be introduced into the unsubstituted steroid in any order, although it is generally preferred to introduce a 9α-halogen substituent last.

An 11β,17α,21-trihydroxy-4-pregnene-3,20-dione compound may be converted into the correspondingly substituted 9α,11β-dichloro- or the 9α-bromo-11β-chloro-17α,21-dihydroxy-4-pregnene-3,20-dione compound by first dehydrating the 11β,17α,21-trihydroxy-4-pregnene-3,20-dione at the 9(11)-position to form the corresponding 9(11)-pregnene, then acetylating at the 21-position, and finally halogenating at the 9α,11β-positions, for example, following the detailed procedures given in Example 5.

All of the above 17α,21-dihydroxy-4-pregnene-3,20-dione compounds may be converted into the corresponding 17α,21-dihydroxy-4,6-pregnadiene-3,20-dione compounds by chloranil dehydrogenation, preferably of the 21-ester, in order to prevent extensive degradation of the dihydroxyacetone side chain, for example, following the detailed procedure in Example 5, which is of general application. Alternately, chloranil dehydrogenation takes place as an intermediate step in the preparation of the desired starting material.

It has been found that the starting materials defined above will react with aqueous formaldehyde solutions in the presence of strong acid to form compounds having the formula:

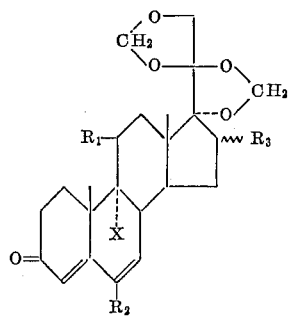

wherein $R_1$ is β-hydroxy or β-halogen but β-halogen is present at $R_1$ only when X is halogen, and $R_2$, $R_3$, and X have the significance above defined. For example, cold, concentrated HCl and formalin are added to a stirred suspension of the steroid in chloroform, cooled to about 0° C. The mixture is then allowed to come to room temperature and stirred for several hours to afford the corresponding 17α,20,20,21 - bis(methylenedioxy)-derivative.

In a preferred embodiment of our invention, the 17α, 20,20,21 - bis(methylenedioxy) - 4,6 - pregnadiene - 3,11-dione compound which has the following formula:

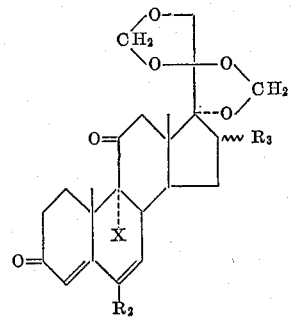

wherein $R_2$, $R_3$, and X have the significance above defined, is prepared by oxidation of the corresponding 11β-hydroxy-17α,20,20,21 - bis(methylenedioxy) - 4,6-pregnadiene-3-one, for example, with chromium trioxide in a non-aqueous base such as pyridine. If desired, however, the 17α,20,20,21-bis(methylenedioxy)-4,6-pregnadiene-3,11-dione may be prepared directly by the reaction of the 17α,21-dihydroxy-4,6-pregnadiene-3,11,20-trione with formaldehyde solution in the presence of an acid as described in the preceding step.

Upon treatment of an 11β-hydroxy-, 11β-halogen-, or 11-keto-17α,20,20,21-bis(methylenedioxy)-4,6 - pregnadiene-3-one compound with an alkyl formate and sodium hydride in an inert atmosphere there is formed the corresponding 17α-20,20,21-bis(methylenedioxy) - 2 - hydroxymethylene-4,6-pregnadiene-3-one which has the following structure:

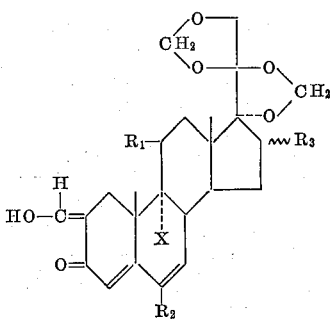

wherein $R_1$ is β-halogen, β-hydroxy and/or β-formyloxy-, or keto-, but β-halogen is present at $R_1$ only when X is halogen, and $R_2$, $R_3$ and X have the significance above defined. In a preferred embodiment of our invention, the steroid is dissolved in a solvent such as benzene and the resulting solution is cooled to room temperature and treated with ethyl formate. The air in the system is replaced with nitrogen, sodium hydride is added and the mixture is stirred at room temperature for several hours.

The 17α,20,20,21-bis(methylenedioxy)-2-hydroxymethylene-4,6-pregnadiene-3-one compound reacts with hydrazine in an inert atmosphere to form the corresponding 17α,20,20,21-bis(methylenedioxy)-4,6-pregnadieno - [3,2-c]pyrazole.

Upon treatment of a 17α,20,20,21-bis(methylenedioxy)-2-hydroxymethylene-4,6-pregnadiene-3-one compound with a lower alkanol in the presence of an acidic reagent such a p-toluenesulfonic acid the corresponding 17α,20,20,21-bis(methylenedioxy)-2-alkoxymethylene - 4, 6-pregnadiene-3-one is formed. When the latter compound is reacted with a monosubstituted hydrazine, the corresponding N-substituted-4,6 - pregnadieno - [3,2-c] pyrazole compounds are formed. The N-substituted-4,6-pregnadieno-[3,2-c]pyrazoles having structure A are designated as the 1'-substituted-4,6-pregnadieno-[3,2-c] pyrazoles, and the N-substituted-pyrazole compounds having structure B are designated as the 2'-substituted-4,6-pregnadieno-[3,2-c]pyrazoles.

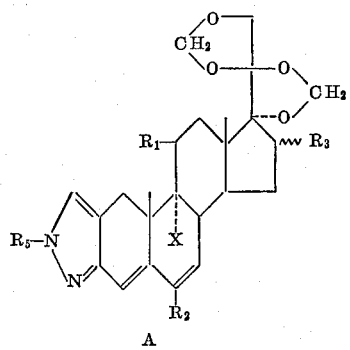

A

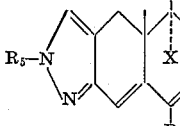

B wherein $R_1$, $R_2$, $R_3$ and X have the significance above defined, and wherein $R_5$ is an alkyl, cycloalkyl, aralkyl or an aryl group. The products formed may be separated by chromatography.

Upon treatment of a 17α,20,20,21-bis(methylenedioxy)-2-hydroxymethylene-4,6-pregnadiene-3-one compound directly with a monosubstituted arylhydrazine, without the intermediate formation of the 2-alkoxymethylene-derivative, one isomer is generally formed in preponderant amounts, whereas when reacting the 17α-20, 20,21-bis(methylenedioxy)-2-alkoxymethylene-4,6 - pregnadiene-3-one compound with a monosubstituted arylhydrazine, significant amounts of both isomers are obtained. When these reactions take place with monosubstituted alkylhydrazines, mixtures may be obtained when starting with the 2-hydroxymethylene-steroid as well as with the 2-alkoxymethylene-steroid. A mixture of isomers may also result from the reaction of a monosubstituted hydrazine with a 2-hydroxymethylene-compound which possibly contains variable amounts of the 2-alkoxymethylene-derivative due to the operating procedures employed, for example, due to recrystallization in the presence of a trace of alcohol a solution of the 2-hydroxymethylene-compound from which acid has not been completely removed.

Among the monosubstituted hydrazines which may be used for the process of our invention are: alkylhydrazines, such as methylhydrazine, ethylhydrazine, propylhydrazines, butylhydrazines, β-hydroxyethylhydrazine, cycloalkylhydrazines; arylhydrazines including phenylhydrazine and the substituted phenylhydrazines, such as o-, m-, and p-halophenylhydrazines, o-, m-, and p-tolylhydrazines, o-, m-, and p-alkoxyphenylhydrazines, o-, m-, and p-nitrophenylhydrazines, 1-hydrazinonaphthalene, 2-hydrazinopyridine, 3-hydrazinopyridine, 4-hydrazinopyridine, 4-hydrazinopyridine oxide, and 2-hydrazinopyrimidine; aralkylhydrazines, such as benzylhydrazine and phenylethylenehydrazine.

There are thus produced the corresponding N-substituted - 4,6-pregnadieno-[3,2-c]pyrazoles including: N-alkyl such as N-methyl-, N-ethyl-, N-butyl-, N-propyl-, N-(β-hydroxyethyl)-; N-cycloalkyl-; N-aryl- which may be derived from any aromatic nucleus, including N-phenyl- and the N-substituted-phenyl derivatives such as o-, m-, and p-halophenyl; o-, m-, and p-tolyl-; o-, m-, and p-alkoxyphenyl-, o-, m-, and p-nitrophenyl-; N-(1''-naphthyl)-, N-(2''-pyridyl)-, N-(3''-pyridyl)-, N-(4''-pyridyl)-, N-(4"-pyridyloxide)-, N-(2"-pyrimidyl)-; N-aralkyl-, such as N-benzyl- and N-phenylethenyl-4,6-pregnadieno-[3,2-c]pyrazoles.

The N-alkyl - 4,6 - pregnadieno-[3,2-c] - pyrazoles may also be prepared by direct alkylation of the N-unsubstituted - 4,6 - pregnadieno - [3,2-c]pyrazoles.

A 17α,20,20,21-bis(methylenedioxy) - 11β - hydroxy-4,6-pregnadieno-[3,2-c] pyrazole which has a 9α-halo-substituent is preferably prepared by the following alternate route. Using the procedures described above, the 9α - halo - 11β,17α,21 - trihydroxy - 4,6 - pregnadiene-3,20-dione is converted into the corresponding 17α,20,20,21-bis(methylenedioxy) - 9α - halo - 11β - hydroxy-4,6-pregnadiene-3-one. The latter compound is then oxidized to the 17α,20,20,21-bis(methylenedioxy) - 9α - halo - 4,6-pregnadiene-3,11-dione, which is reacted with ethyl formate and sodium hydride to form the 2-hydroxymethylene-derivative. The latter compound is reacted with hydrazine, or a mono-substituted hydrazine, to give the corresponding 17α,20,20,21-bis(methylenedioxy) - 9α - halo - 11-oxo-4,6-pregnadieno-[3,2-c]pyrazole compound, or the N-substituted derivative thereof. The latter compound is then reduced to the corresponding 17α,20,20,21-bis(methylenedioxy)-9α-halo-11β-hydroxy-4,6 - pregnadieno-[3,2-c]pyrazole compound, for example, by adding a saturated solution of sodium borohydride to a solution of the steroid in a mixture of triethylamine and isopropyl alcohol to which we prefer to add a little water, and allowing the mixture to stand overnight.

The N-unsubstituted - 17α,20,20,21 - bis(methylenedioxy) - 4,6 - pregnadieno-[3,2-c]pyrazole compounds are converted into N-acyl-derivatives having the following structures:

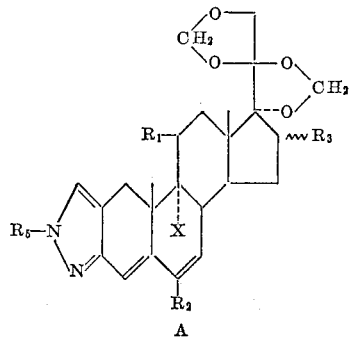

A

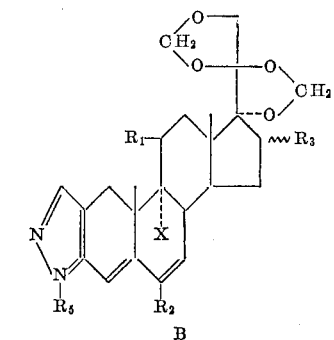

B wherein $R_1$ is β-halogen, β-hydroxy or keto, but β-halogen is present at $R_1$ only when X is halogen; $R_2$, $R_3$ and X have the meaning described above; and wherein $R_5$ is an acyl group, by treating with an acylating agent, e.g., a lower hydrocarbon carboxylic acid acylating agent such as benzoic anhydride or tertiary butyl acetyl chloride; a lower alkanoic anhydride or lower alkanoyl halide such as acetic anhydride, propionic anhydride or acetyl chloride; or a polybasic anhydride such as β,β-dimethylglutaric anhydride, succinic anhydride and the like, in the presence of an organic base such as pyridine.

Upon treatment of any of the above described 17α,20,20,21-bis(methylenedioxy) - 4,6 - pregnadieno - [3,2-c] pyrazole compounds with a dilute organic acid, for example, a 60% aqueous solution of formic acid, the 17α,20,20,21 - bis(methylenedioxy) - protecting group is removed and there is obtained the corresponding 17α,21-dihydroxy - 20 - oxo - 4,6 - pregnadieno - [3,2-c]pyrazoles which are represented by structures A and B:

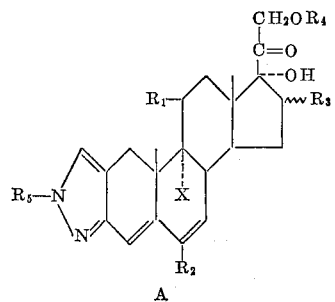

A

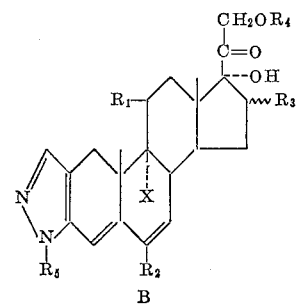

B wherein $R_1$ is β-halogen, β-hydroxy or keto, but β-halogen is present at $R_1$ only when X is halogen; $R_2$, $R_3$ and X have the meaning described above; and wherein $R_5$ is acyl, alkyl, cycloalkyl, aryl or aralkyl and $R_4$ is hydrogen, an acyl group corresponding to the organic acid used in this reaction, or a mixture of the two.

Any acyl groups present at $R_4$ and/or at $R_5$ may be removed by treating the steroid with sodium methoxide in methanol at room temperature to form the corresponding 17α,21-dihydroxy - 20 - oxo - 4,6 - pregnadieno-[3,2-c]pyrazole. Acyl groups present at the $R_4$ position may be selectively removed by treatment with aqueous acetic acid.

The compounds of our invention include, among others, the following:

11β,17α,21-trihydroxy-20-oxo-4,6-pregnadieno-[3,2-c]pyrazole,

11β,17α,21-trihydroxy-16α-methyl-20-oxo-4,6-pregnadieno-[3,2-c]pyrazole,

11β,17α,21-trihydroxy-16β-methyl-20-oxo-4,6-pregnadieno-[3,2-c]pyrazole,

11β,17α,21-trihydroxy-16-methylene-20-oxo-4,6-pregnadieno-[3,2-c]pyrazole,

11β,17α,21-trihydroxy-6-methyl-20-oxo-4,6-pregnadieno-[3,2-c]pyrazole,

11β,17α,21-trihydroxy-6,16α-dimethyl-20-oxo-4,6-pregnadieno-[3,2-c]pyrazole,

11β,17α,21-trihydroxy-6,16β-dimethyl-20-oxo-4,6-pregnadieno-[3,2-c]pyrazole,

11β,17α,21-trihydroxy-6-methyl-16-methylene-20-oxo-4,6-pregnadieno-[3,2-c]pyrazole, 6-fluoro-11β,17α,21-trihydroxy-20-oxo-4,6-pregnadieno-[3,2-c]pyrazole, 6-fluoro-11β,17α,21-trihydroxoy-16α-methyl-20-oxo-4,6-pregnadieno-[3,2-c]pyrazole, 6-fluoro-11β-17α,21-trihydroxy-16β-methyl-20-oxo-4,6-pregnadieno-[3,2-c]pyrazole, 6-fluoro-11β,17α,21-trihydroxy-16-methylene-20-oxo-4,6-pregnadieno-[3,2-c]pyrazole, 9α-fluoro-11β,17α,21-trihydroxy-20-oxo-4,6-pregnadieno-[3,2-c]pyrazole, 9α-fluoro-11β,17α,21-trihydroxy-16α-methyl-20-oxo-4,6-pregnadieno-[3,2-c]pyrazole,
9α-fluoro-11β,17α,21-trihydroxy-16β-methyl-20-oxo-4,6-pregnadieno-[3,2-c]pyrazole,
9α-fluoro-11β,17α,21-trihydroxy-16-methylene-20-oxo-4,6-pregnadieno-[3,2-c]pyrazole,
9α-chloro-11β,17α,21-trihydroxy-20-oxo-4,6-pregnadieno-[3,2-c]pyrazole,
9α-chloro-11β,17α,21-trihydroxy-16α-methyl-20-oxo-4,6-pregnadieno-[3,2-c]pyrazole,
9α-chloro-11β,17α,21-trihydroxy-16β-methyl-20-oxo-4,6-pregnadieno-[3,2-c]pyrazole,
9α-chloro-11β,17α,21-trihydroxy-16-methylene-20-oxo-4,6-pregnadieno-[3,2-c]pyrazole,
9α-fluoro-11β,17α,21-trihydroxy-6-methyl-20-oxo-4,6-pregnadieno-[3,2-c]pyrazole,
9α-fluoro-11β,17α,21-trihydroxy-6,16α-dimethyl-20-oxo-4,6-pregnadieno-[3,2-c]pyrazole,
9α-fluoro-11β,17α,21-trihydroxy-6,16β-dimethyl-20-oxo-4,6-pregnadieno-[3,2-c]pyrazole,
9α-fluoro-11β,17α,21-trihydroxy-6-methyl-16-methylene-20-oxo-4,6-pregnadieno-[3,2-c]pyrazole,
9α-chloro-11β,17α,21-trihydroxy-6-methyl-20-oxo-4,6-pregnadieno-[3,2-c]pyrazole,
9α-chloro-11β,17α,21-trihydroxy-6,16α-dimethyl-20-oxo-4,6-pregnadieno-[3,2-c]pyrazole,
9α-chloro-11β,17α,21-trihydroxy-6,16β-dimethyl-20-oxo-4,6-pregnadieno-[3,2-c]pyrazole,
9α-chloro-11β,17α,21-trihydroxy-6-methyl-16-methylene-20-oxo-4,6-pregnadieno-[3,2-c]pyrazole,
9α-chloro-6-fluoro-11β,17α,21-trihydroxy-20-oxo-4,6-pregnadieno-[3,2-c]pyrazole,
9α-chloro-6-fluoro-11β,17α,21-trihydroxy-16α-methyl-20-oxo-4,6-pregnadieno-[3,2-c]pyrazole,
9α-chloro-6-fluoro-11β,17α,21-trihydroxy-16β-methyl-20-oxo-4,6-pregnadieno-[3,2-c]pyrazole,
9α-chloro-6-fluoro-11β,17α,21-trihydroxy-16-methylene-20-oxo-4,6-pregnadieno-[3,2-c]pyrazole,
6,9α-difluoro-11β,17α,21-trihydroxy-20-oxo-4,6-pregnadieno-[3,2-c]pyrazole,
6,9α-difluoro-11β,17α,21-trihydroxy-16α-methyl-20-oxo-4,6-pregnadieno-[3,2-c]pyrazole,
6,9α-difluoro-11β,17α,21-trihydroxy-16β-methyl-20-oxo-4,6-pregnadieno-[3,2-c]pyrazole,
6,9α-difluoro-11β,17α,21-trihydroxy-16-methylene-20-oxo-4,6-pregnadieno-[3,2-c]pyrazole, and the 11-oxo-analogues of all of the above compounds, the 9α,11β-dichloro-17α,21-dihydroxy-20-oxo-4,6-pregnadieno-[3,2-c]pyrazole,
9α,11β-dichloro-17α,21-dihydroxy-16α-methyl-20-oxo-4,6-pregnadieno-[3,2-c]pyrazole,
9α,11β-dichloro-17α,21-dihydroxy-16β-methyl-20-oxo-4,6-pregnadieno-[3,2-c]pyrazole,
9α,11β-dichloro-17α,21-dihydroxy-16-methylene-20-oxo-4,6-pregnadieno-[3,2-c]pyrazole,
9α,11β-dichloro-6-fluoro-17α,21-dihydroxy-20-oxo-4,6-pregnadieno-[3,2-c]pyrazole,
9α,11β-dichloro-6-fluoro-17α,21-dihydroxy-16α-methyl-20-oxo-4,6-pregnadieno-[3,2-c]pyrazole,
9α,11β-dichloro-6-fluoro-17α,21-dihydroxy-16β-methyl-20-oxo-4,6-pregnadieno-[3,2-c]pyrazole,
9α,11β-dichloro-6-fluoro-17α,21-dihydroxy-16-methylene-20-oxo-4,6-pregnadieno-[3,2-c]pyrazole,
9α,11β-dichloro-17α,21-dihydroxy-6-methyl-20-oxo-4,6-pregnadieno-[3,2-c]pyrazole,
9α,11β-dichloro-17α,21-dihydroxy-6,16α-dimethyl-20-oxo-4,6-pregnadieno-[3,2-c]pyrazole,
9α,11β-dichloro-17α,21-dihydroxy-6,16β-dimethyl-20-oxo-4,6-pregnadieno-[3,2-c]pyrazole,
9α,11β-dichloro-17α,21-dihydroxy-6-methyl-16-methylene-20-oxo-4,6-pregnadieno-[3,2-c]pyrazole,
9α-bromo-11β-chloro-17α,21-dihydroxy-20-oxo-4,6-pregnadieno-[3,2-c]pyrazole,
9α-bromo-11β-chloro-17α,21-dihydroxy-16α-methyl-20-oxo-4,6-pregnadieno-[3,2-c]pyrazole,
9α-bromo-11β-chloro-17α,21-dihydroxy-16β-methyl-20-oxo-4,6-pregnadieno-[3,2-c]pyrazole,
9α-bromo-11β-chloro-17α,21-dihydroxy-16-methylene-20-oxo-4,6-pregnadieno-[3,2-c]pyrazole,
9α-bromo-11β-chloro-6-fluoro-17α,21-dihydroxy-20-oxo-4,6-pregnadieno-[3,2-c]pyrazole,
9α-bromo-11β-chloro-6-fluoro-17α,21-dihydroxy-16α-methyl-20-oxo-4,6-pregnadieno-[3,2-c]pyrazole,
9α-bromo-11β-chloro-6-fluoro-17α,21-dihydroxy-16β-methyl-20-oxo-4,6-pregnadieno-[3,2-c]pyrazole,
9α-bromo-11β-chloro-6-fluoro-17α,21-dihydroxy-16-methylene-20-oxo-4,6-pregnadieno-[3,2-c]pyrazole,
9α-bromo-11β-chloro-17α,21-dihydroxy-6-methyl-20-oxo-4,6-pregnadieno-[3,2-c]pyrazole,
9α-bromo-11β-chloro-17α,21-dihydroxy-6,16α-dimethyl-20-oxo-4,6-pregnadieno-[3,2-c]pyrazole,
9α-bromo-11β-chloro-17α,21-dihydroxy-6,16β-dimethyl-20-oxo-4,6-pregnadieno-[3,2-c]pyrazole, and 9α-bromo-11β-chloro-17α,21-dihydroxy-6-methyl-16-methylene-20-oxo-4,6-pregnadieno-[3,2-c]pyrazole as well as the 1'- and 2'-alkyl-, the 1'- and 2'-cycloalkyl-, the 1'- and 2'-aryl-, and the 1'- and 2'-aralkyl-derivatives of all of the above named compounds.

The N-acyl-derivatives of the above described 17α,21-dihydroxy-20-oxo - 4,6 - pregnadieno-[3,2-c]pyrazoles are preferably obtained by treating the corresponding N-acyl-17α,20,20,21 - bis(methylenedioxy) - 4,6 - pregnadieno-[3,2-c]pyrazole compound with a dilute organic acid to remove the 17α,20,20,21-bis(methylenedioxy)-protecting group.

The 21-acyl derivatives of the above described 17α,21-dihydroxy - 20 - oxo - 4,6-pregnadieno-[3,2-c]pyrazoles in which $R_5$ is H may be prepared by heating an N-acyl-17α,21-dihydroxy-20 - oxo - 4,6-pregnadieno-[3,2-c]pyrazole 21-acylate with aqueous acetic acid, whereupon the N-acyl-group is selectively removed.

The N-acyl-21-acylate derivatives of the above described 17α,21-dihydroxy-20-oxo-4,6-pregnadieno-[3,2-c]pyrazoles in which both acyl groups are the same may be prepared (1) by reacting a 17α,21-dihydroxy-20-oxo-4,6-pregnadieno-[3,2-c]pyrazole with two equivalents of an acylating agent or (2) by reaction of an N-acyl-17α,21-dihydroxy-20-oxo - 4,6 - pregnadieno-[3,2-c]pyrazole with one equivalent of an acylating agent in which the acyl group of the acylating agent is the same as the acyl group already present at the N-position of the pyrazole.

The N-acyl-21-acylate derivatives of the above described 17α,21-dihydroxy - 20 - oxo - 4,6 - pregnadieno-[3,2-c]pyrazoles in which the acyl groups are different are prepared by reaction of an N-acyl-17α,21-dihydroxy-20-oxo-4,6-pregnadieno-[3,2-c]pyrazole with an acylating agent in which the acyl group of the acylating agent is different from the acyl group already present at the N-position of the pyrazole.

Acylating agents which can be used for this purpose include a lower hydrocarbon carboxylic acid acylating agent such as benzoic anhydride, tertiary butyl acetyl chloride; a lower alkanoic anhydride or lower alkanoyl halide such as acetic anhydride, propionic anhydride; or a polybasic anhydride such as β,β-dimethyl-glutaric anhydride, succinic anhydride and the like, in the presence of an organic base such as pyridine.

The 17α,21-dihydroxy-20-oxo-4,6-pregnadieno-[3,2-c]pyrazole is reacted with methane sulfonyl chloride in a non-aqueous base to form the 21-mesylate. A steroid in which $R_5$ is hydrogen is preferably converted to the N-acyl derivative before undergoing this reaction.

The 17α,21-dihydroxy-20-oxo-4,6-pregnadieno-[3,2-c]pyrazole 21-mesylate is heated with an alkali iodide to form the 21-iodo-compound. In a preferred method for carrying out this reaction, sodium iodide is added to the steroid dissolved in acetone and the resulting mixture is heated at reflux temperature for approximately one hour.

The 17α-hydroxy-21-iodo-20-oxo-4,6 - pregnadieno - [3,2-c]pyrazole is heated with an alkali bisulfite in a solvent to form the corresponding 21-desoxy-compound which have the structures A and B:

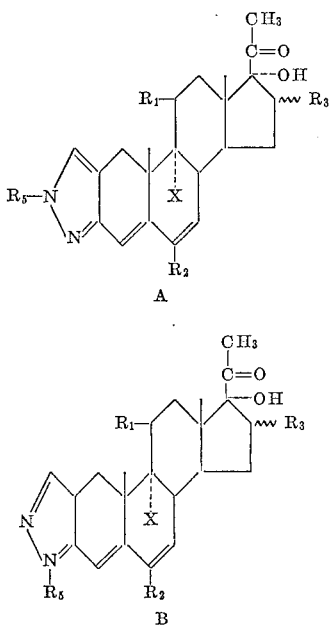

A

B wherein $R_1$, $R_2$, $R_3$, $R_5$ and X have the significance above defined. A preferred method is to add sodium bisulfite to a suspension of the steroid in aqueous ethanol and then heat the mixture under reflux for a period of about an hour.

Thus the novel compounds of our invention which are formed from the above reactions include:

11β,17α-dihydroxy-20-oxo-4,6-pregnadieno-[3,2-c]pyrazole,
11β,17α-dihydroxy-16α-methyl-20-oxo-4,6-pregnadieno-[3,2-c]pyrazole,
11β,17α-dihydroxy-16β-methyl-20-oxo-4,6-pregnadieno-[3,2-c]pyrazole,
11β,17α-dihydroxy-16-methylene-20-oxo-4,6-pregnadieno-[3,2-c]pyrazole,
11β,17α-dihydroxy-6-methyl-20-oxo-4,6-pregnadieno-[3,2-c]pyrazole,
11β,17α-dihydroxy-6,16α-dimethyl-20-oxo-4,6-pregnadieno-[3,2-c]pyrazole,
11β,17α-dihydroxy-6,16β-dimethyl-20-oxo-4,6-pregnadieno-[3,2-c]pyrazole,
11β,17α-dihydroxy-6-methyl-16-methylene-20-oxo-4,6-pregnadieno-[3,2-c]pyrazole,
6-fluoro-11β,17α-dihydroxy-20-oxo-4,6-pregnadieno-[3,2-c]pyrazole,
6-fluoro-11β,17α-dihydroxy-16α-methyl-20-oxo-4,6-pregnadieno-[3,2-c]pyrazole,
6-fluoro-11β,17α-dihydroxy-16β-methyl-20-oxo-4,6-pregnadieno-[3,2-c]pyrazole,
6-fluoro-11β,17α-dihydroxy-16-methylene-20-oxo-4,6-pregnadieno-[3,2-c]pyrazole,
9α-fluoro-11β,17α-dihydroxy-20-oxo-4,6-pregnadieno-[3,2-c]pyrazole,
9α-fluoro-11β,17α-dihydroxy-16α-methyl-20-oxo-4,6-pregnadieno-[3,2-c]pyrazole,
9α-fluoro-11β,17α-dihydroxy-16β-methyl-20-oxo-4,6-pregnadieno-[3,2-c]pyrazole,
9α-fluoro-11β,17α-dihydroxy-16-methylene-20-oxo-4,6-pregnadieno-[3,2-c]pyrazole,
9α-chloro-11β,17α-dihydroxy-20-oxo-4,6-pregnadieno-[3,2-c]pyrazole,
9α-chloro-11β,17α-dihydroxy-16α-methyl-20-oxo-4,6-pregnadieno-[3,2-c]pyrazole,
9α-chloro-11β,17α-dihydroxy-16β-methyl-20-oxo-4,6-pregnadieno-[3,2-c]pyrazole,
9α-chloro-11β,17α-dihydroxy-16-methylene-20-oxo-4,6-pregnadieno-[3,2-c]pyrazole,
9α-fluoro-11β,17α-dihydroxy-6-methyl-20-oxo-4,6-pregnadieno-[3,2-c]pyrazole,
9α-fluoro-11β,17α-dihydroxy-6,16α-dimethyl-20-oxo-4,6-pregnadieno-[3,2-c]pyrazole,
9α-fluoro-11β,17α-dihydroxy-6,16β-dimethyl-20-oxo-4,6-pregnadieno-[3,2-c]pyrazole,
9α-fluoro-11β,17α-dihydroxy-6-methyl-16-methylene-20-oxo-4,6-pregnadieno-[3,2-c]pyrazole,
9α-chloro-11β,17α-dihydroxy-6-methyl-20-oxo-4,6-pregnadieno-[3,2-c]pyrazole,
9α-chloro-11β,17α-dihydroxy-6,16α-dimethyl-20-oxo-4,6-pregnadieno-[3,2-c]pyrazole,
9α-chloro-11β,17α-dihydroxy-6,16β-dimethyl-20-oxo-4,6-pregnadieno-[3,2-c]pyrazole,
9α-chloro-11β,17α-dihydroxy-6-methyl-16-methylene-20-oxo-4,6-pregnadieno-[3,2-c]pyrazole,
9α-chloro-6-fluoro-11β,17α-dihydroxy-20-oxo-4,6-pregnadieno-[3,2-c]pyrazole,
9α-chloro-6-fluoro-11β,17α-dihydroxy-16α-methyl-20-oxo-4,6-pregnadieno-[3,2-c]pyrazole,
9α-chloro-6-fluoro-11β,17α-dihydroxy-16β-methyl-20-oxo-4,6-pregnadieno-[3,2-c]pyrazole,
9α-chloro-6-fluoro-11β,17α-dihydroxy-16-methylene-20-oxo-4,6-pregnadieno-[3,2-c]pyrazole,
6,9α-difluoro-11β,17α-dihydroxy-20-oxo-4,6-pregnadieno-[3,2-c]pyrazole,
6,9α-difluoro-11β,17α-dihydroxy-16α-methyl-20-oxo-4,6-pregnadieno-[3,2-c]pyrazole,
6,9α-difluoro-11β,17α-dihydroxy-16β-methyl-20-oxo-4,6-pregnadieno-[3,2-c]pyrazole,
6,9α-difluoro-11β,17α-dihydroxy-16-methylene-20-oxo-4,6-pregnadieno-[3,2-c]pyrazole and the 11-oxo-analogues of all of the above compounds, the 9α,11β-dichloro-17α-hydroxy-20-oxo-4,6-pregnadieno-[3,2-c]pyrazole,
9α,11β-dichloro-17α-hydroxy-16α-methyl-20-oxo-4,6-pregnadieno-[3,2-c]pyrazole,
9α,11β-dichloro-17α-hydroxy-16β-methyl-20-oxo-4,6-pregnadieno-[3,2-c]pyrazole,
9α,11β-dichloro-17α-hydroxy-16-methylene-20-oxo-4,6-pregnadieno-[3,2-c]pyrazole,
9α,11β-dichloro-6-fluoro-17α-hydroxy-20-oxo-4,6-pregnadieno-[3,2-c]pyrazole,
9α,11β-dichloro-6-fluoro-17α-hydroxy-16α-methyl-20-oxo-4,6-pregnadieno-[3,2-c]pyrazole,
9α,11β-dichloro-6-fluoro-17α-hydroxy-16β-methyl-20-oxo-4,6-pregnadieno-[3,2-c]pyrazole,
9α,11β-dichloro-6-fluoro-17α-hydroxy-16-methylene-20-oxo-4,6-pregnadieno-[3,2-c]pyrazole,
9α,11β-dichloro-17α-hydroxy-6-methyl-20-oxo-4,6-pregnadieno-[3,2-c]pyrazole,
9α,11β-dichloro-17α-hydroxy-6,16α-dimethyl-20-oxo-4,6-pregnadieno-[3,2-c]pyrazole,
9α,11β-dichloro-17α-hydroxy-6,16β-dimethyl-20-oxo-4,6-pregnadieno-[3,2-c]pyrazole,
9α,11β-dichloro-17α-hydroxy-6-methyl-16-methylene-20-oxo-4,6-pregnadieno-[3,2-c]pyrazole,
9α-bromo-11β-chloro-17α-hydroxy-20-oxo-4,6-pregnadieno-[3,2-c]pyrazole,
9α-bromo-11β-chloro-17α-hydroxy-16α-methyl-20-oxo-4,6-pregnadieno-[3,2-c]pyrazole,
9α-bromo-11β-chloro-17α-hydroxy-16β-methyl-20-oxo-4,6-pregnadieno-[3,2-c]pyrazole,
9α-bromo-11β-chloro-17α-hydroxy-16-methylene-20-oxo-4,6-pregnadieno-[3,2-c]pyrazole,
9α-bromo-11β-chloro-6-fluoro-17α-hydroxy-20-oxo-4,6-pregnadieno-[3,2-c]pyrazole,
9α-bromo-11β-chloro-6-fluoro-17α-hydroxy-16α-methyl-20-oxo-4,6-pregnadieno-[3,2-c]pyrazole, 9α-bromo-11β-chloro-6-fluoro-17α-hydroxy-16β-methyl-20-oxo-4,6-pregnadieno-[3,2-c]pyrazole,
9α-bromo-11β-chloro-6-fluoro-17α-hydroxy-16-methylene-20-oxo-4,6-pregnadieno-[3,2-c]pyrazole,
9α-bromo-11β-chloro-17α-hydroxy-6-methyl-20-oxo-4,6-pregnadieno-[3,2-c]pyrazole,
9α-bromo-11β-chloro-17α-hydroxy-6,16α-dimethyl-20-oxo-4,6-pregnadieno-[3,2-c]pyrazole,
9α-bromo-11β-chloro-17α-hydroxy-6,16β-dimethyl-20-oxo-4,6-pregnadieno-[3,2-c]pyrazole,
9α-bromo-11β-chloro-17α-hydroxy-6-methyl-16-methylene-20-oxo-4,6-pregnadieno-[3,2-c]pyrazole, as well as the 1'- and 2'-alkyl-, the 1'- and 2'-cycloalkyl-, the 1'- and 2'-aryl-, the 1'- and 2'-aralkyl- and the N-acyl-derivatives of all of the above named compounds.

The 21-dihydrogen phosphate esters are prepared by the reaction of the corresponding 21-iodo compound with a mixture of silver phosphate and phosphoric acid. Both the mono- and dialkali metal salts may be obtained by neutralization of the dihydrogen phosphate ester with an alkali methoxide. Treatment with additional amounts of alkali methoxide will convert an N-acyl-steroid ($R_5$=acyl) into the free amine ($R_5$=H) dialkali metal salt from which the dihydrogen phosphate can be obtained by contacting with an ion exchange resin.

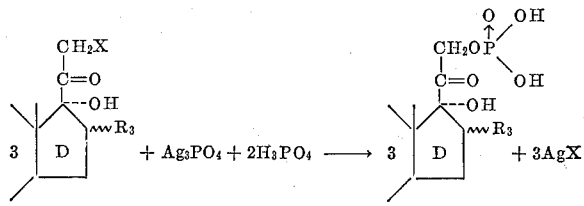

The A, B, C and pyrazole rings are not shown in the above equation, as the substituent groups on these rings do not affect the course of reaction and in general are unchanged during reaction. $R_3$ has the meaning above defined and X is halogen.

The 21-fluoro-17α-hydroxy-20-oxo-4,6-pregnadieno-[3,2-c]pyrazoles are prepared from the corresponding 17α,21-dihydroxy-20-oxo-4,6-pregnadieno-[3,2-c]pyrazole 21-mesylate by heating with an alkali fluoride in a solvent to form a mixture of a 17α,21-epoxy-compound and the corresponding 21-fluoro compound. These compounds are separated by partition chromatography, or by chromatography on a weak adsorbent such as silica gel. There is thus obtained the 21-fluoro-derivatives of all of the compounds named in columns 2–4. The 21-fluoro-derivatives are represented by structures A and B:

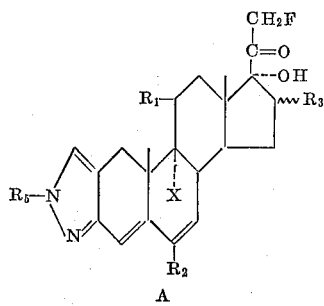

A

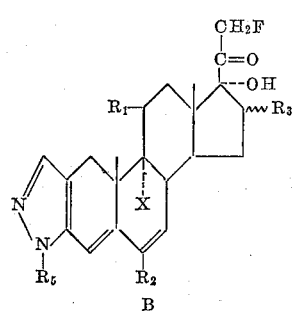

B wherein $R_1$, $R_2$, $R_3$, $R_5$ and X have the significance above described. All of the 4,6-pregnadieno-[3,2-c]pyrazoles described in the foregoing structures form salts such as the hydrochloride, sulfate, chlorate, perchlorate, picrate, and trichloroacetate, on treatment with the corresponding acid. Formation of crystalline salts, especially the hydrochloride salts, provides a means of isolating the 4,6-pregnadieno-[3,2-c]pyrazoles.

A further embodiment of our invention comprises novel pharmaceutical compositions containing the novel 4,6-pregnadieno-[3,2-c]pyrazoles exemplified in the foregoing structures.

The following examples illustrate methods of carrying out the present invention but it is to be understood that these examples are given for purposes of illustration and not of limitation. Details of the above described reactions are to be found in the examples.

*Example 1*

To a suspension of 25.0 g. of 11β,17α,21-trihydroxy-4,6-pregnadiene-3,20-dione in 1.5 l. of alcohol free chloroform cooled to about 5° C. in an ice bath is added with constant stirring 750 ml. of cold, concentrated hydrochloric acid and then 750 ml. of formalin (low in methanol). The mixture is removed from the ice bath and stirred at room temperature for 7 hours. The layers are separated and the aqueous phase is back-extracted twice with chloroform. The combined organic layers are washed twice with a 5% solution of sodium bicarbonate, and twice with a saturated salt solution. The solution is dried over magnesium sulfate and evaporated to dryness under reduced pressure. The residue is triturated with methanol to afford a crystalline solid. This material contains no detectable amount of starting material by paper-strip chromatography but shows two U.V. absorbing spots near the solvent front (methanol-formamide 2:1 vs. benzene-n-hexane 1:1). A 2.425 g. aliquot is recrystallized three times from a mixture of benzene and n-hexane to give 17α,20,20,21-bis(methylenedioxy)-11β-hydroxy-4,6-pregnadiene-3-one which is used in the subsequent step of the synthesis without further purification.

A solution of 400 mg. of 17α,20,20,21-bis(methylenedioxy)-11β-hydroxy-4,6-pregnadiene-3-one in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization from a mixture of ethyl acetate and ether to give 17α,20,20,21-bis(methylenedioxy)-4,6-pregnadiene-3,11-dione.

The 17α,20,20,21 - bis(methylenedioxy) - 4,6-pregnadiene-3,11-dione (1.350 g.) is dissolved in 23 ml. of dry, hot benzene and the resulting solution is cooled to room temperature and treated with 0.96 ml. of freshly distilled ethyl formate. The air in the system is replaced with nitrogen and 560 mg. of sodium hydride (as a 58% dispersion in mineral oil) is added. The system is again evacuated and filled with nitrogen, and the mixture is stirred magnetically at room temperature overnight. The mixture is poured into an excess of a saturated aqueous solution of sodium dihydrogen phosphate and the product is extracted four times with benzene. The organic extracts are washed three times with water and dried over sodium sulfate. Removal of the solvent gives the crude product which is dissolved in ether and purified as the sodium salt by extraction into a 10% solution of sodium carbonate. The aqueous alkaline extracts are again acidified with an excess of a saturated aqueous solution of sodium dihydrogen phosphate and extracted into ether and into chloroform. The combined organic extracts are dried over sodium sulfate and evaporated to dryness to give 17α,20,20,21 - bis(methylenedioxy) - 2-hydromethylene-4,6-pregnadiene-3,11-dione.

The 17α,20,20,21-bis(methylenedioxy)-2-hydroxymethylene-4,6-pregnadiene-3,11-dione (850 mg.) is dissolved in 9.2 ml. of absolute ethanol and treated with a solution of 0.16 ml. of hydrazine hydrate dissolved in 0.16 ml. of absolute ethanol. The mixture is refluxed in a nitrogen atmosphere for about 45 minutes and then evaporated to dryness under reduced pressure. The residue is washed three times with cold water and the resulting amorphous solid is dried at 80° C. for 1 hour in high vacuum to give 17α,20,20,21 - bis(methylenedioxy) - 11 - oxo-4,6-pregnadieno-[3,2-c]pyrazole.

To a solution of 100 mg. of 17α,20,20,21-bis(methylenedioxy)-11-oxo-4,6-pregnadieno-[3,2-c]pyrazole in 2 ml. of pyridine is added one milliequivalent of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. in vacuo to afford the N-acetyl-17α,20,20,21-bis(methylenedioxy)-11-oxo-4,6-pregnadieno-[3,2-c]pyrazole which is isolated by the addition of water and filtration.

In accordance with the above procedure, but using an equivalent quantity of another acylating agent in place of acetic anhydride, there is obtained the corresponding N-acyl derivative.

The N - acetyl - 17α,20,20,21-bis(methylenedioxy)-11-oxo-4,6-pregnadieno-[3,2-c]pyrazole (720 mg.) is heated in a steam bath with 24 ml. of a 60% aqueous solution of formic acid for about 30 minutes. The excess reagent is removed in vacuo using a water bath at about 50° C. as the source of heat. The residue is flushed four times with n-hexane and then dried at 60° C. in high vacuum to give an amorphous solid which is a mixture of N-acetyl-17α,21 - dihydroxy - 11,20-dioxo-4,6-pregnadieno-[3,2-c]pyrazole and N-acetyl-21-formyloxy-17α-hydroxy-11,20-dioxo-4,6-pregnadieno-[3,2-c]pyrazole, which compounds are separated by chromatography.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 17α,21-dihydroxy-11,20-dioxo-4,6-pregnadieno-[3,2-c]pyrazole.

To a solution of 100 mg. of N-acetyl-17α,21-dihydroxy-11,20-dioxo-4,6-pregnadieno-[3,2-c]pyrazole in 2 ml. of pyridine is added one milliequivalent of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. in vacuo to afford the N-acetyl-17α,21-dihydroxy-11,20-dioxo-4,6-pregnadieno-[3,2-c]pyrazole 21-acetate which is isolated by the addition of water and filtration.

In accordance with the above procedure, but using an equivalent quantity of another acylating agent in place of acetic anhydride, there is obtained the corresponding N-acetyl - 17α,21 - dihydroxy-11,20-dioxo-4,6-pregnadieno-[3,2-c]pyrazole 21-acylate.

In accordance with the above procedure, but starting with the 17α,21-dihydroxy-11,20-dioxo-4,6-pregnadieno-[3,2-c]pyrazole, and using two milliequivalents of another acylating agent there is obtained the corresponding N-acyl-21-acylate thereof.

A solution of 5.73 g. of N-acetyl-17α,21-dihydroxy-11,20-dioxo-4,6-pregnadieno-[3,2-c]pyrazole 21-acetate in 60 ml. of 80% (v./v.) acetic acid is refluxed for 1.5 hours. This solution is diluted with 400 ml. of ice-water and extracted with ethyl acetate. The ethyl acetate extracts are washed with water and with saturated sodium bicarbonate solution, dried, and evaporated to dryness in vacuo. Recrystallization of the resulting product affords the 17α,21 - dihydroxy - 11,20 - dioxo-4,6-pregnadieno-[3,2-c]pyrazole 21-acetate.

To a solution of 85 mg. of N-acetyl-17α,21-dihydroxy-11,20-dioxo-4,6-pregnadieno-[3,2-c]pyrazole in 0.5 ml. of pyridine, cooled to 0° C. is added 0.015 ml. of methane sulfonyl chloride. The resulting mixture is allowed to stand at a temperature of approximately 0° C. for a period of approximately one hour. Water is then added to the reaction mixture and the precipitate which forms is recovered by filtration, washed with water, and dried to give N-acetyl-17α,21-dihydroxy-11,20-dioxo-4,6-pregnadieno-[3,2-c]pyrazole 21-mesylate.

To a 180 mg. of N-acetyl-17α,21-dihydroxy-11,20-dioxo-4,6-pregnadieno-[3,2 - c]pyrazole 21 - mesylate dissolved in 10 ml. of acetone is added 300 mg. of sodium iodide. The resulting mixture is heated at reflux temperature for a period of approximately 1 hour, and the reaction solution is cooled to room temperature and diluted with water. The material which precipitates is recovered by filtration, washed with water, and dried to give N-acetyl-17α-hydroxy-21-iodo-11,20-dioxo-4,6-pregnadieno-[3,2-c]pyrazole.

The N - acetyl - 17α - hydroxy - 21 - iodo - 11,20-dioxo-4,6-pregnadieno-[3,2-c]pyrazole is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the material which separates is recovered by filtration. The product is washed with water, dried and recrystallized from ethyl acetate to give N-acetyl-17α-hydroxy - 11,20 - dioxo - 4,6 - pregnadieno - [3,2-c]pyrazole.

A 500 mg. aliquot of the above compound is dissolved in 2.4 ml. of pure methanol and allowed to react with 0.5 ml. of a 1.33 N solution of sodium methoxide in methanol at room temperature under nitrogen atmosphere for ten minutes. The alkoxide is neutralized with acetic acid and the mixture is then taken to dryness and flushed with n-hexane. The residue is washed with water, filtered and dried to constant weight to give 17α-hydroxy-11,20-dioxo-4,6-pregnadieno-[3,2-c]pyrazole.

To a solution of 62 mg. of N-acetyl-17α,21-dihydroxy-11,20 - dioxo - 4,6 - pregnadieno - [3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of N-acetyl-17α,21-epoxy - 11,20 - dioxo - 4,6 - pregnadieno - [3,2-c]pyrazole and N - acetyl - 21 - fluoro - 17α - hydroxy - 11,20-dioxo-4,6-pregnadieno-[3,2-c]pyrazole, which compounds are separated by partition chromatography, or by chromatography on silica gel.

A 500 mg. aliquot of the above compound is dissolved in 2.4 ml. of pure methanol and allowed to react with 0.5 ml. of a 1.33 N solution of sodium methoxide in methanol at room temperature under nitrogen atmosphere for ten minutes. The alkoxide is neutralized with acetic acid and the mixture is then taken to dryness and flushed with n-hexane. The residue is washed with water, filtered and dried to constant weight to give 21-fluoro-17α-hydroxy-11,20-dioxo - 4,6 - pregnadieno - [3,2 - c] pyrazole.

In accordance with the above procedures, but starting with the 11β,17α,21 - trihydroxy - 16α - methyl - 4,6-pregnadiene-3,20-dione or 11β,17α,21-trihydroxy-16β-methyl-4,6-pregnadiene-3,20-dione in place of the 11β,17α,21-trihydroxy-4,6-pregnadiene-3,20-dione, there are obtained as products the corresponding 17α,21-dihydroxy-16α-methyl - 11,20 - dioxo - 4,6 - pregnadieno - [3,2-c]pyrazole or 17α,21 - dihydroxy - 16β - methyl - 11,20-dioxo - 4,6 - pregnadieno - [3,2-c]pyrazole, and the N-acyl-, the 21-acylate, and the N-acyl-21-acylate derivatives thereof; the 17α - hydroxy - 16α - methyl - 11,20 - dioxo - 4,6 - pregnadieno - [3,2 - c]pyrazole or 17α-hydroxy - 16β - methyl - 11,20 - dioxo - 4,6 - pregnadieno - [3,2-c]pyrazole and the N - acyl - derivatives thereof; and the 21-fluoro-17α-hydroxy-16α-methyl-11,20 - dioxo - 4,6 - pregnadieno - [3,2-c]pyrazole or 21 - fluoro - 17α - hydroxy - 16β - methyl - 11,20 - dioxo - 4,6 - pregnadieno - [3,2-c]pyrazole and the N-acyl derivatives thereof.

In accordance with the above procedures, but starting with the 11β,17α,21 - trihydroxy - 16 - methylene - 4,6-pregnadiene-3,20-dione in place of the 11β,17α,21-trihydroxy-4,6-pregnadiene-3,20-dione, there are obtained as products the corresponding 17α,21-dihydroxy-16-methylene - 11,20 - dioxo - 4,6 - pregnadieno - [3,2-c]pyrazole and the N-acyl-, the 21-acylate, and the N-acyl-21-acylate derivatives thereof; the 17α-hydroxy-16-methylene - 11,20 - dioxo - 4,6 - pregnadieno - [3,2-c]pyrazole and the N-acyl derivatives thereof; and the 21-fluoro - 17α - hydroxy - 16 - methylene - 11,20 - dioxo-4,6-pregnadieno-[3,2-c]pyrazole and the N-acyl derivatives thereof.

*Example 2*

To a suspension of 25.0 g. of 6-fluoro-11β,17α-21-trihydroxy-4,6-pregnadiene-3,20-dione in 1.5 liters of alcohol-free chloroform cooled to about 5° C. in an ice bath is added with constant stirring 750 ml. of cold, concentrated hydrochloric acid and then 750 ml. of formalin (low in methanol). The mixture is removed from the ice bath and stirred at room temperature for 7 hours. The layers are separated and the aqueous phase is back-extracted twice with chloroform. The combined organic layers are washed twice with a 5% solution of sodium bicarbonate, and twice with a saturated salt solution. The solution is dried over magnesium sulfate and evaporated to dryness under reduced pressure. The residue is triturated with methanol to afford a crystalline solid. This material contains no detectable amount of starting material by paperstrip chromatography but show two U.V. absorbing spots near the solvent front (methanol-formamide 2:1 vs. benzene-n-hexane 1:1). A 2.425 g. aliquot is recrystallized three times from a mixture of benzene and n-hexane to give 6-fluoro-17α,20,20,21-bis (methylene - dioxy) - 11β - hydroxy - 4,6 - pregnadiene-3-one, which is used in the subsequent step of the synthesis without further purification.

The 17α,20,20,21 - bis(methylenedioxy) - 6 - fluoro-11β-hydroxy-4,6-pregnadiene-3-one (1.350 g.) is dissolved in 23 ml. of dry, hot benzene and the resulting solution is cooled to room temperature and treated with 0.96 ml. of freshly distilled ethyl formate. The air in the system is replaced with nitrogen and 560 mg. of sodium hydride (as a 58% dispersion in mineral oil) is added. The system is again evacuated and filled with nitrogen, and the mixture is stirred magnetically at room temperature overnight. The mixture is poured into an excess of a saturated aqueous solution of sodium dihydrogen phosphate and the product is extracted four times with benzene. The organic extracts are washed three times with water and dried over sodium sulfate. Removal of the solvent gives the crude product which is dissolved in ether and purified as the sodium salt by extraction into a 10% solution of sodium carbonate. The aqueous alkaline extracts are again acidified with an excess of a saturated aqueous solution of sodium dihydrogen phosphate and extracted into ether and into chloroform. The combined organic extracts are dried over sodium sulfate and evaporated to dryness to give 17α,20,20,21-bis(methylenedioxy)-6-fluoro - 11β-hydroxy-2-hydroxymethylene-4,6-pregnadiene-3-one.

The 17α,20,20,21 - bis(methylenedioxy) - 6 - fluoro-11β - hydroxy - 2 - hydroxymethylene - 4,6 - pregnadiene-3-one (850 mg.) is dissolved in 9.2 ml. of absolute ethanol and treated with a solution of 0.16 ml. of hydrazine hydrate dissolved in 0.16 ml. of absolute ethanol. The mixture is refluxed in a nitrogen atmosphere for about 45 minutes and then evaporated to dryness under reduced pressure. The residue is washed three times with cold water and the resulting amorphous solid is dried at 80° C. for 1 hour in high vacuum to give 17α,20,20,21-bis(methylenedioxy) - 6 - fluoro - 11β - hydroxy-4,6-pregnadieno-[3,2-c]pyrazole.

To a solution of 100 mg. of 17α,20,20,21-bis(methylenedioxy)-6-fluoro - 11β - hydroxy - 4,6 - pregnadieno-[3,2-c]pyrazole in 2 ml. of pyridine is added one milliequivalent of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. in vacuo to afford the N-acetyl - 17α,20,20,21 - bis(methylenedioxy) - 6 - fluoro-11β - hydroxy - 4,6 - pregnadieno - [3,2 - c]pyrazole which is isolated by the addition of water and filtration.

In accordance with the above procedure, but using an equivalent quantity of another acylating agent in place of the acetic anhydride, there is obtained the corresponding N-acyl derivative.

The N - acetyl - 17α,20,20,21-bis(methylenedioxy)-6 - fluoro - 11β - hydroxy - 4,6 - pregnadieno - [3,2 - c] pyrazole (720 mg.) is heated in a steam bath with 24 ml. of a 60% aqueous solution of formic acid for about 30 minutes. The excess reagent is removed in vacuo using a water bath at about 50° C. as the source of heat. The residue is flushed four times with n-hexane and then dried at 60° C. in high vacuum to give a solid which is a mixture of N-acetyl-6-fluoro-11β,17α,21-trihydroxy-20-oxo-4,6-pregnadieno-[3,2-c]pyrazole and N-acetyl-6-fluoro-21-formyloxy-11β,17α-dihydroxy - 20 - oxo - 4,6-pregnadieno-[3,2-c]pyrazole, which compounds are separated by chromatography.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 6-fluoro-11β,17α,21-trihydroxy - 20 - oxo - 4,6 - pregnadieno-[3.2-c]pyrazole.

To a solution of 100 mg. of N-acetyl-6-fluoro-11β,17α,21-trihydroxy-20-oxo - 4,6 - pregnadieno - [3,2-c] pyrazole in 2 ml. of pyridine is added one milliequivalent of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. in vacuo to afford the N-acetyl-6 - fluoro - 11β,17α,21 - trihydroxy - 20-oxo-4,6-pregnadieno-[3,2-c]pyrazole 21-acetate which is isolated by addition of water and filtration.

In accordance with the above procedures, but using an equivalent quantity of another acylating agent in place of the acetic anhydride, there is obtained the corresponding N-acetyl - 6 - fluoro - 11β,17α,21 - trihydroxy - 20-oxo - 4,6 - pregnadieno - [3,2-c]pyrazole 21 - acylate.

In accordance with the above procedure, but starting with the 6 - fluoro - 11β,17α,21 - trihydroxy - 20 - oxo-4,6-pregnadieno-[3,2-c]pyrazole, and using two equivalents of another acylating agent there is obtained the corresponding N-acyl-21-acylate thereof.

A solution of 5.73 g. of N-acetyl-6-fluoro-11α,17α,21-trihydroxy - 20 - oxo - 4,6 - pregnadieno - [3,2-c]pyrazole 21-acetate in 60 ml. of 80% (v./v.) acetic acid is refluxed for 1.5 hours. This solution is diluted with 400 ml. of ice-water and extracted with ethyl acetate. The ethyl acetate extract is washed with water and with saturated sodium bicarbonate solution, dried, and evaporated to dryness in vacuo. Recrystallization of the resulting product affords the 6-fluoro-17α,21-dihydroxy-11,20-dioxo-4,6 - pregnadieno - [3,2-c]pyrazole 12 - acetate.

To a solution of 85 mg. of N-acetyl-6-fluoro-11β,17α,21-trihydroxy-20-oxo-4,6-pregnadieno - [3,2 - c]pyrazole in 0.5 ml. of pyridine, cooled to 0° C. is added 0.015 ml. of methane sulfonyl chloride. The resulting mixture is allowed to stand at a temperature of approximately 0° C. for a period of approximately 1 hour. Water is then added to the reaction mixture and the precipitate which forms is recovered by filtration, washed with water, and dried to give N-acetyl-6-fluoro-11β,17α,21-trihydroxy-20-oxo - 4,6 - pregnadieno - [3,2 - c]pyrazole 21 - mesylate.

To 180 mg. of N-acetyl-6-fluoro-11β,17α,21-trihydroxy-20 - oxo - 4,6 - pregnadieno - [3,2 - c]pyrazole 21 - mesylate dissolved in 10 ml. of acetone is added 300 mg. of sodium iodide. The resulting mixture is heated at reflux temperature for a period of approximately 1 hour, and the reaction solution is cooled to room temperature and diluted with water. The material which precipitates is recovered by filtration, washed with water, and dried to give N - acetyl - 6 - fluoro - 11β,17α - dihydroxy - 21-iodo-20-oxo-4,6-pregnadieno-[3,2-c]pyrazole.

The N - acetyl - 6 - fluoro - 11β,17α - dihydroxy - 21-iodo-20-oxo-4,6-pregnadieno-[3,2-c]pyrazole is dissolved in a mixture of 5 ml. of water and 5 ml. of ethanol. To the resulting suspension is added 500 mg. of sodium bisulfite and the mixture is heated under reflux for a period of about one hour. The reaction solution is cooled, diluted with water, and the material which separates is recovered by filtration. The product is washed with water, dried and recrystallized from ethyl acetate to give N-acetyl - 6 - fluoro - 11β,17α - dihydroxy - 20 - oxo - 4,6-pregnadieno-[3,2-c]pyrazole.

A 500 mg. aliquot of the above compound is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 6-fluoro-11β,17α-dihydroxy-20-oxo-4,6-pregnadieno-[3,2-c]pyrazole.

To a solution of 62 mg. of N-acetyl-6-fluoro-11β,17α,21 - trihydroxy - 20 - oxo - 4,6 - pregnadieno - [3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of N-acetyl-17α,21 - epoxy - 6 - fluoro - 11β - hydroxy - 20 - oxo - 4,6-pregnadieno-[3,2-c]pyrazole and N-acetyl-6,21-difluoro-11β,17α - dihydroxy - 20 - oxo - 4,6 - pregnadieno - [3,2-c] pyrazole which compounds are separated by partition chromatography, or by chromatography on silica gel.

In accordance with the above procedures, but starting with the corresponding N-acyl derivatives, there are obtained as products the N-acyl-6-fluoro-11β,17α-dihydroxy-20-oxo-4,6-pregnadieno-[3,2-c]pyrazole and the N-acyl-6,21 - difluoro - 11β,17α - dihydroxy - 20 - oxo - 4,6 - pregnadieno-[3,2-c]pyrazole.

A 500 mg. aliquot of the above compound is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give the 6,21-difluoro-11β,17α dihydroxy-20-oxo-4,6-pregnadieno-[3,2-c]pyrazole.

In accordance with the above procedures, but starting with the 11β,17α,21-trihydroxy-6,16α-dimethyl-4,6-pregnadiene-3,20-dione in place of the 6-fluoro-11β,17α,21-trihydroxy-4,6-pregnadiene-3,20-dione there are obtained as products the corresponding 11β,17α,21-trihydroxy-6,16α-dimethyl - 20 - oxo - 4,6-pregnadieno-[3,2-c]pyrazole and the N-acyl-, the 21-acylate, and the N-acyl-21-acylate derivatives thereof; the 11β,17α-dihydroxy-16α-dimethyl-20-oxo-4,6-pregnadieno[3,2-c]pyrazole and the N-acyl derivative thereof; and the 21-fluoro-11β,17α-dihydroxy-6,16α - dimethyl - 20 - oxo - 4,6 - pregnadieno - [3,2-c] pyrazole and the N-acyl derivative thereof.

*Example 3*

To a suspension of 25.0 g. of 11β,17α,21-trihydroxy-6-methyl-4,6-pregnadiene-3,20-dione in 1.5 l. of alcohol-free chloroform cooled to about 5° C. in an ice bath is added with constant stirring 750 ml. of cold, concentrated hydrochloric acid and then 750 ml. of formalin (low in methanol). The mixture is removed from the ice bath and stirred at room temperature for 7 hours. The layers are separated and the aqueous phase is back-extracted twice with chloroform. The combined organic layers are washed twice with a 5% solution of sodium bicarbonate, and twice with a saturated salt solution. The solution is dried over magnesium sulfate and evaporated under reduced pressure. The residue is triturated with methanol to afford a crystalline solid. This material contains no detectable amount of starting material by paperstrip chromatography but shows two U.V. absorbing spots near the solvent front (methanol-formamide 2:1 vs. benzene-n-hexane 1:1). A 2.425 g. aliquot is recrystallized three times from a mixture of benzene and n-hexane to give 17α,20,20,21 - bis(methylenedioxy) - 11β - hydroxy - 6-methyl-4,6-pregnadiene-3-one which is used in the subsequent step of the synthesis without further purification.

A solution of 400 mg. of 17α,20,20,21-bis(methylenedioxy) - 11β - hydroxy - 6 - methyl - 4,6 - pregnadiene - 3-one in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then water until neutral. The organic solvent layer is then dried, the solvents are evaporated therefrom in vacuo, and the residual crystalline material is purified by crystallization from a mixture of ethyl acetate and ether to give 17α,20,20,21-bis(methylenedioxy)-6-methyl-4,6-pregnadiene-3,11-dione.

The 17α,20,20,21 - bis(methylenedioxy)-6-methyl-4,6-pregnadiene-3,11-dione (1.350 g.) is dissolved in 23 ml. of dry, hot benzene and the resulting solution is cooled to room temperature and treated with 0.96 ml. of freshly distilled ethyl formate. The air in the system is replaced with nitrogen and 560 mg. of sodium hydride (as a 58% dispersion in mineral oil) is added. The system is again evacuated and filled with nitrogen, and the mixture is stirred magnetically at room temperature overnight. The mixture is poured into an excess of a saturated aqueous solution of sodium dihydrogen phosphate and the product is extracted four times with benzene. The organic extracts are washed three times with water and dried over sodium sulfate. Removal of the solvent gives the crude product which is dissolved in ether and purified as the sodium salt by extraction into a 10% solution of sodium carbonate. The aqueous alkaline extracts are again acidified with an excess of a saturated aqueous solution of sodium dihydrogen phosphate and extracted into ether and into chloroform. The combined organic extracts are dried over sodium sulfate and evaporated to dryness to give 17α,20,20,21-bis(methylenedioxy)-2-hydroxymethylene-6-methyl-4,6-pregnadiene-3,11-dione.

The 17α,20,20,21-bis(methylenedioxy)-2-hydroxymethylene-6-methyl-4,6-pregnadiene-3,11-dione (850 mg.) is dissolved in 9.2 ml. of absolute ethanol and treated with a solution of 0.16 ml. of hydrazine hydrate dissolved in 0.16 ml. of absolute ethanol. The mixture is refluxed in a nitrogen atmosphere for about 45 minutes and then evaporated to dryness under reduced pressure. The residue is washed three times with cold water and the resulting amorphous solid is dried at 80° C. for 1 hour in high vacuum to give 17α,20,20,21-bis(methylenedioxy)-6-methyl-11-oxo-4,6-pregnadieno-[3,2-c]pyrazole.

To a solution of 100 mg. of 17α,20,20,21-bis(methylenedioxy)-6-methyl-11-oxo-4,6-pregnadieno-[3,2-c]pyrazole in 2 ml. of pyridine is added one milliequivalent of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8) and water (until the aqueous layer is neutral). The ethyl acetate solution is dried with anhydrous sodium sulfate. The solvent is then distilled at about 40° C., in vacuo to afford the N-acetyl-17α,20,20,21-bis(methylenedioxy)-6-methyl-11-oxo-4,6-pregnadieno-[3,2-c]pyrazole, which is isolated by the addition of water and filtration.

In accordance with the above procedure, but using an equivalent quantity of another acylating agent in place of the acetic anhydride, there is obtained the corresponding N-acyl derivative.

The N-acetyl - 17α,20,20,21 - bis(methylenedioxy) - 6-methyl-11-oxo-4,6-pregnadieno-[3,2-c]pyrazole (720 mg.) is heated on a steam bath with 24 ml. of a 60% solution of formic acid for about 30 minutes. The excess reagent is removed in vacuo using a water bath at about 50° C. as the source of heat. The residue is flushed four times with n-hexane and then dried at 60° C. in high vacuum to give an amorphous solid which is a mixture of N-acetyl-17α,21 - dihydroxy-6-methyl-11,20-dioxo-4,6-pregnadieno-[3,2-c]pyrazole and N-acetyl-21-formyloxy-17α-hydroxy-6 - methyl - 11,20-dioxo-4,6-pregnadieno-[3,2-c]pyrazole, which compounds are separated by chromatography.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 17α,21-dihydroxy-6-methyl-11,20-dioxo - 4,6 - pregnadieno - [3,2 - c] pyrazole.

To a solution of 100 mg. of N-acetyl-17α,21-dihydroxy-6-methyl-11,20-dioxo-4,6-pregnadieno-[3,2-c]pyrazole in 2 ml. of pyridine is added one milliequivalent of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. in vacuo to afford the N-acetyl-17α,21-dihydroxy-6-methyl-11,20 - dioxo-4,6-pregnadieno-[3,2-c]pyrazole 21-acetate which is isolated by addition of water and filtration.

In accordance with the above procedure, but using an equivalent quantity of another acylating agent in place of acetic anhydride, there is obtained the corresponding N-acetyl - 17α,21 - dihydroxy - 6-methyl-11,20-dioxo-4,6-pregnadieno-[3,2-c]pyrazole 21-acylate.

In accordance with the above procedures, but starting with the 17α,21 - dihydroxy - 6 - methyl-11,20-dioxo-4,6-pregnadieno-[3,2-c]pyrazole, and using two milliequivalents of another acylating agent, there is obtained the corresponding N-acyl-17α,21-dihydroxy-6-methyl-11,20-dioxo-4,6-pregnadieno-[3,2-c]pyrazole 21-acylate.

A solution of 5.73 g. of the N-acetyl-17α,21-dihydroxy-6-methyl-11,20-dioxo-4,6-pregnadieno-[3,2-c]pyrazole 21-acetate in 60 ml. of 80% (v./v.) acetic acid is refluxed for 1.5 hours. This solution is diluted with 400 ml. of ice-water and extracted with ethyl acetate. The ethyl acetate extract is washed with water and with saturated sodium bicarbonate solution, dried, and evaporated to dryness in vacuo. Recrystallization of the resulting product affords the 17α,21-dihydroxy-6-methyl-11,20-dioxo-4,6-pregnadieno-[3,2-c]pyrazole 21-acetate.

To a solution of 85 mg. of N-acetyl-17α,21-dihydroxy-6-methyl-11,20-dioxo-4,6-pregnadieno-[3,2-c]pyrozole in 0.5 ml. of pyridine, cooled to 0° C., is added 0.015 ml. of methane sulfonyl chloride. The resulting mixture is allowed to stand at a temperature of approximately 0° C. for a period of approximately one hour. Water is then added to the reaction mixture and the precipitate which forms is recovered by filtration, washed with water, and dried to give N-acetyl-17β,21-dihydroxy-6-methyl-11,20-dioxo-4,6-pregnadieno-[3,2-c]pyrazole 21-mesylate.

To 180 mg. of N-acetyl-17α,21-dihydroxy-6-methyl-11,20-dioxo-4,6-pregnadieno-[3,2-c]pyrazole 21-mesylate dissolved in 10 ml. of acetone is added 300 mg. of sodium iodide. The resulting mixture is heated at reflux temperature for a period of approximately one hour, and the reaction solution is cooled to room temperature and diluted with water. The material which precipitates is recovered by filtration, washed with water, and dried to give N-acetyl-17α-hydroxy-21-iodo-6-methyl-11,20-dioxo-4,6-pregnadieno-[3,2-c]pyrazole.

The N - acetyl - 17α-hyroxy-21-iodo-6-methyl-11,20-dioxo-4,6-pregnadieno-[3,2-c]pyrazole is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and the material which separates is recovered by filtration. The product is washed with water, dried and recrystallized from ethyl acetate to give N - acetyl - 17α - hydroxy - 6 - methyl - 11,20 - dioxo - 4, 6 - pregnadieno - [3,2 - c]pyrazole.

A 500 mg. aliquot of the above compound is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 17α-hydroxy - 6 - methyl - 11,20 - dioxo - 4,6 - pregnadieno-[3,2 - c]pyrazole.

To a solution of 62 mg. of N-acetyl-17α,21-dihydroxy-6 - methyl - 11,20 - dioxo - 4,6 - pregnadieno - [3,2 - c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of N-acetyl-17α,21-epoxy-6-methyl-11,20-dioxo-4,6-pregnadieno-[3,2-c]pyrazole and N-acetyl-21-fluoro-17α-hydroxy - 6 - methyl - 11,20 - dioxo - 4,6 - pregnadieno - [3, 2 - c]pyrazole, which compounds are separated by partition chromatography, or by chromatography on silica gel.

In accordance with the above procedures, but starting with the 9α-fluoro-11β,17α,21-trihydroxy-4,6-pregnadiene-3,20-dione in place of the 11β,17α,21-trihydroxy-4,6-pregnadiene-3,20-dione there are obtained as products the corresponding 9α-fluoro-17α,21-dihydroxy-11,20-dioxo-4,6-pregnadieno-[3,2-c]pyrazole and the N-acyl-, the 21-acylate, and the N-acyl-21-acylate derivatives thereof in which the two acyl groups may be the same or different; the 9α-fluoro-17α-hydroxy-11,20-dioxo-4,6-pregnadieno-[3,2-c]pyrazole and the N-acyl derivatives thereof; and the 9α, 21-difluoro-17α-hydroxy-11,20-dioxo-4,6-pregnadieno-[3,2-c]pyrazole and the N-acyl derivatives thereof.

In accordance with the above procedures, but starting with the 9α-fluoro-6-methyl-11β,17α,21-trihydroxy-4,6-pregnadiene-3,20-dione in place of the 11β,17α, 21-trihydroxy-6-methyl-4,6-pregnadiene-3,20-dione, there are obtained as products the corresponding 9α-fluoro-17α, 21-dihydroxy-6-methyl-11,20-dioxo-4,6-pregnadieno-[3,2-c]pyrazole and the N-acyl-, the 21-acylate, and the N-acyl-21-acylate derivatives thereof in which the two acyl groups may be the same or different; the 9α-fluoro-17α-hydroxy-6-methyl-11,20-dioxo-4,6 - pregnadieno - [3,2 - c] pyrazole and the N-acyl derivatives thereof; and the 9α,21 - difluoro - 17α - hydroxy - 6 - methyl - 11,20 - dioxo - 4,6-pregnadieno-[3,2-c]pyrazole and the N-acyl derivatives thereof.

*Example 4*

To a suspension of 25.0 g. of 11β,17α,21-trihydroxy-16α-methyl-4,6-pregnadiene-3,20-dione in 1.5 liters of alcohol-free chloroform cooled to about 5° C. in an ice bath is added with constant stirring 750 ml. of cold, concentrated hydrochloric acid and then 750 ml. of formalin (low in methanol). The mixture is removed from the ice bath and stirred at room temperature for 7 hours. The layers are separated and the aqueous phase is back-extracted twice with chloroform. The combined organic layers are washed twice with a 5% solution of sodium bicarbonate, and twice with a saturated salt solution. The solution is dried over magnesium sulfate and evaporated to dryness under reduced pressure. The residue is triturated with methanol to afford a crystalline solid. This material contains no detectable amount of starting material by paperstrip chromatography. A 2.425 g. aliquot is recrystallized three times from a mixture of benzene and n-hexane to give 17α,20,20,21-bis (methylenedioxy) - 11β - hydroxy - 16α - methyl - 4,6-pregnadiene-3-one which is used in the subsequent step of the synthesis without further purification.

The 17α,20,20,21 - bis(methylenedioxy)-11β-hydroxy-16α-methyl-4,6-pregnadiene-3-one (1.350 g.) is dissolved in 25 ml. of dry, hot benzene and the resulting solution is cooled to room temperature and treated with 0.96 ml. of freshly distilled ethyl formate. The air in the system is replaced with nitrogen and 560 mg. of sodium hydride (as a 58% dispersion in mineral oil) is added. The system is again evacuated and filled with nitrogen, and the mixture is stirred magnetically at room temperature overnight. The mixture is poured into an excess of a saturated aqueous solution of sodium dihydrogen phosphate and the product is extracted four times with benzene. The organic extracts are washed three times with water and dried over sodium sulfate. Removal of the solvent gives the crude product which is dissolved in ether and purified as the sodium salt by extraction into a 10% solution of sodium carbonate. The aqueous alkaline extracts are again acidified with an excess of a saturated aqueous solution of sodium dihydrogen phosphate and extracted into ether and into chloroform. The combined organic extracts are dried over sodium sulfate and evaporated to dryness to give 17α,20,20,21-bis (methylenedioxy) - 11β - hydroxy - 2 - hydroxymethylene-16α-methyl-4,6-pregnadiene-3-one.

The 17α,20,20,21-bis(methylenedioxy)-11β-hydroxy-2-hydroxymethylene-16α-methyl-4,6-pregnadiene-3-one (850 mg.) is dissolved in 9.2 ml. of absolute ethanol and treated with a solution of 0.16 ml. of hydrazine hydrate dissolved in 0.16 ml. of absolute ethanol. The mixture is refluxed in a nitrogen atmosphere for about 45 minutes and then evaporated to dryness under reduced pressure. The residue is washed three times with cold water and the resulting amorphous solid is dried at 80° C. for 1 hour in high vacuum to give 17α,20,20,21-bis(methylenedioxy)-11β-hydroxy-16α-methyl-4,6-pregnadieno-[3,2-c]pyrazole.

To a solution of 100 mg. of 17α,20,20,21-bis(methylenedioxy)-11β-hydroxy - 16α - methyl - 4,6 - pregnadieno-[3,2-c]pyrazole in 2 ml. of pyridine is added 0.5 ml. of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. in vacuo to afford the N-acetyl-17α,20,20,21-bis(methylenedioxy) - 11β - hydroxy - 16α - methyl - 4,6-pregnadieno-[3,2-c]pyrazole which is isolated by the addition of water and filtration.

In accordance with the above procedure, but using an equivalent quantity of another acylating agent in place of acetic anhydride there is obtained the corresponding N-acyl-steroid.

The N-acetyl - 17α,20,20,21-bis(methylenedioxy)-11β-hydroxy-16α-methyl - 4,6 - pregnadieno - [3,2-c]pyrazole (720 mg.) is heated in a steam bath with 24 ml. of a 60% aqueous solution of formic acid for about 30 minutes. The excess reagent is removed in vacuo using a water bath at about 50° C. as the source of heat. The residue is flushed four times with n-hexane and then dried at 60° C. in high vacuum to give an amorphous solid which is a mixture of N-acetyl-11β,17α,21-trihydroxy-16α-methyl-20-oxo-4,6-pregnadieno-[3,2-c]pyrazole and N-acetyl-21-formyloxy-11β,17α-dihydroxy - 16α - methyl-20-oxo-4,6-pregnadieno - [3,2-c]pyrazole which compounds are separated by chromatography.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 11β,17α-21-trihydroxy-16α-methyl-20-oxo - 4,6 - pregnadieno-[3,2-c] pyrazole.

To a solution of 100 mg. of N-acetyl-11β,17α,21-trihydroxy-16α-methyl-20-oxo - 4,6 - pregnadieno-[3,2-c]pyrazole in 2 ml. of pyridine is added one milliequivalent of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. in vacuo. The N-acetyl-11β,17α,21-trihydroxy 16α-methyl-20-oxo-4,6-pregnadieno-[3,2-c]pyrazole 21-acetate is then isolated by addition of water and filtration.

In accordance with the above procedures, but using an equivalent quantity of another acylating agent in place of acetic anhydride, there is obtained the corresponding N-acetyl-11β,17α,21-trihydroxy - 16α - methyl-20-oxo-4,6-pregnadieno-[3,2-c]pyrazole 21-acylate.

In accordance with the above procedure, but starting with the 11β,17α,21 - trihydroxy-16α-methyl-20-oxo-4,6-pregnadieno-[3,2-c]pyrazole and using two milliequivalents of another acylating agent there is obtained the corresponding N-acyl-11β,17α,21-trihydroxy-16α-methyl-20-oxo-4,6-pregnadieno-[3,2-c]pyrazole 21-acylate.

A solution of 5.73 g. of N-acetyl-11β,17α,21-trihydroxy-16α-methyl-20-oxo-4,6-pregnadieno - [3,2-c]pyrazole 21-acetate in 60 ml. of 80% (v./v.) acetic acid is refluxed for 1.5 hours. This solution is diluted with 400 ml. of icewater and extracted with ethyl acetate. The ethyl acetate extract is washed with water and with saturated sodium bicarbonate solution dried, and evaporated to dryness in vacuo. Recrystallization of the resulting product affords 11β,17α-21 - trihydroxy - 16α - methyl-20-oxo-4,6-pregnadieno-[3,2-c]pyrazole 21-acetate.

To a solution of 85 mg. of N-acetyl-11β,17α,21-trihydroxy-16α-methyl-20-oxo - 4,6 - pregnadieno-[3,2-c]pyrazole in 0.5 ml. of pyridine, cooled to 0° C., is added 0.015 ml. of methane sulfonyl chloride. The resulting mixture is allowed to stand at a temperature of approximately 0° C. for a period of approximately one hour. Water is then added to the reaction mixture and the precipitate which forms is recovered by filtration, washed with water, and dried to give N-acetyl-11β,17α,21-trihydroxy - 16α - methyl-20-oxo-4,6-pregnadieno-[3,2-c]pyrazole 21-mesylate.

To 180 mg. of N-acetyl-11β,17α,21-trihydroxy-16α-methyl-20-oxo-4,6-pregnadieno-[3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. The material which precipitates is recovered by filtration, washed with water, and dried to give N-acetyl-11β,17α - dihydroxy - 21 - iodo - 16α - methyl-20-oxo-4,6-pregnadieno-[3,2-c]pyrazole.

The N - acetyl-11β,17α-dihydroxy-21-iodo-16α-methyl-20-oxo-4,6-pregnadieno-[3,2-c]pyrazole is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and the material which separates is recovered by filtration. The product is washed with water, dried and recrystallized from ethyl acetate to give N-acetyl-11β, 17α - dihydroxy - 16α - methyl - 20-oxo-4,6-pregnadieno-[3,2-c]pyrazole.

To a solution of 62 mg. of N-acetyl-11β,17α,21-trihydroxy - 20-oxo-4,6-pregnadieno-[3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of N-acetyl-17α,21-epoxy-11β - hydroxy-16α-methyl-20-oxo-4,6-pregnadieno-[3,2-c] pyrazole and N-acetyl-21-fluoro-11β,17α-dihydroxy-16α-methyl - 20-oxo-4,6-pregnadieno-[3,2-c]pyrazole, which compounds are separated by partition chromatography or by chromatography on silica gel.

A 500 mg. aliquot of the N-acetyl-21-fluoro-11β,17α-dihydroxy - 16α - methyl-20-oxo-4,6-pregnadieno-[3,2-c] pyrazole is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give the 21 - fluoro - 11β,17α - dihydroxy-16α-methyl-20-oxo-4,6-pregnadieno-[3,2-c]pyrazole.

In accordance with the above procedures, but starting with the 11β,17α,21-trihydroxy-6-methyl-4,6-pregnadiene-3,20-dione in place of the 11β,17α,21-trihydroxy-16α-methyl-4,6-pregnadiene-3,20-dione, there are obtained as products the corresponding 11β,17α,21-trihydroxy-6-methyl-20-oxo-4,6-pregnadieno-[3,2-c]pyrazole and the N-acyl-, the 21-acylate, and the N-acyl-21-acylate derivatives thereof in which the two acyl groups may be the same or different; the 11β,17α-dihydroxy-6-methyl-20-oxo-4,6-pregnadieno-[3,2-c]pyrazole and the N-acyl derivatives thereof; and the 21-fluoro-11β,17α-dihydroxy-6-methyl-20-oxo-4,6-pregnadieno-[3,2-c]pyrazole and the N-acyl derivatives thereof.

*Example 5*

To a suspension of 10 g. of 9α,11β-dichloro-17α,21-dihydroxy-4,6-pregnadiene-3,20-dione in 475 ml. of alcohol-free chloroform and 300 ml. of methylene chloride, cooled to about 5° C. in an ice bath, is added with constant stirring 189 ml. of cold, concentrated hydrochloric acid and then 189 ml. of formalin (low in methanol). The mixture is removed from the ice bath and stirred at room temperature for 2 hours. The layers are separated and the aqueous phase is back-extracted twice with chloroform. The combined organic layers are washed with water, then with a 5% solution of sodium bicarbonate and again with water. The solution is dried over magnesium sulfate and evaporated to dryness under reduced pressure. The residue is flushed three times with methanol. Hot methanol is then added and the product is filtered and then crystallized from a mixture of methylene chloride and n-hexane to give 17α,20,20,21-bis(methylenedioxy)-9α,11β-dichloro-4,6-pregnadiene-3-one.

The 17α,20,20,21-bis(methylenedioxy)-9α,11β-dichloro-4,6-pregnadiene-3-one (500 mg.) is suspended in 8.5 cc. of dry benzene and treated with 0.15 ml. of freshly distilled ethyl formate. The air in the system is replaced with nitrogen and 225 mg. of sodium hydride (as a 58% dispersion in mineral oil is added). The system is again evacuated and filled with nitrogen. The mixture is stirred under nitrogen for ½ hour after which time 0.2 ml. of ethyl formate is added and the mixture is stirred magnetically at room temperature overnight. The mixture is poured into an excess of a saturated aqueous solution of sodium dihydrogen phosphate and the product is extracted four times with benzene. The organic extracts are washed three times with water and dried over sodium sulfate. Removal of the solvent gives the crude product which is dissolved in ether and purified as a sodium salt by extraction into a 10% solution of sodium carbonate. The aqueous alkaline extracts are again acidified with an excess of a saturated aqueous solution of sodium dihydrogen phosphate and extracted into ether. The combined organic extracts are dried over sodium sulfate and evaporated to dryness to give 17α,20,20,21-bis(methylenedioxy) - 9α,11β-dichloro-2-hydroxymethylene-4,6-pregnadiene-3-one.

The 17α,20,20,21-bis(methylenedioxy)-9α,11β-dichloro-2-hydroxymethylene-4,6-pregnadiene-3-one (65 mg.) is dissolved in 0.7 ml. of absolute ethanol and treated with a solution of 0.12 ml. of hydrazine hydrate dissolved in 0.12 ml. of absolute ethanol. The mixture is refluxed in a nitrogen atmosphere for about 45 minutes and then evaporated to dryness under reduced pressure. The residue is dissolved in chloroform and petroleum ether is added to give a solid which is 17α,20,20,21-bis(methylenedioxy) - 9α,11β - dichloro - 4,6 - pregnadieno-[3,2-c]pyrazole.

To a solution of 100 mg. of 17α,20,20,21-bis(methylenedioxy) - 9α,11α - dichloro - 4,6 - pregnadieno-[3,2-c]pyrazole in 2 ml. of pyridine is added one milliequivalent of propionic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. in vacuo to afford the N-propionyl-17α,20,20,21 - bis(methylenedioxy) - 9α,11β-dichloro-4,6-pregnadieno-[3,2-c]pyrazole which is isolated by the addition of water and filtration.

In accordance with the above procedures, but using an equivalent quantity of another acylating agent in place of propionic anhydride, there is obtained the corresponding N-acyl-derivative.

The N-propionyl-17α,20,20,21-bis(methylenedioxy)-9α,11β-dichloro-4,6-pregnadieno-[3,2-c]pyrazole (25 mg.) is heated on a steam bath with 5 cc. of a 60% aqueous solution of formic acid for about 30 minutes. The excess reagent is removed under reduced pressure using a water bath at about 50° C. as the source of heat. The residue is flushed with n-hexane. The residue is then dissolved in acetone and precipitated with n-hexane to give an amorphous solid which is a mixture of N-propionyl-9α,11β-dichloro-17α,21-dihydroxy-20-oxo - 4,6 - pregnadieno-[3,2-c]-pyrazole and N-propionyl - 9α,11β - dichloro-21-formyloxy-17α-hydroxy-20-oxo-4,6 - pregnadieno-[3,2-c]pyrazole, which compounds are separated by chromatography.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 9α,11β-dichloro-17α,21-dihydroxy-20-oxo-4,6-pregnadieno-[3,2-c]pyrazole.

To a solution of 100 mg. of N-propionyl-9α,11β-dichloro-17α,21-dihydroxy-20-oxo - 4,6 - pregnadieno-[3,2-c]-pyrazole in 2 ml. of pyridine is added 0.5 ml. of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C., in vacuo. The product is then crystallized from a solvent; alternately, the product may be chromatographed on alumina to give the N-propionyl-9α,11β-dichloro-17α,21-dihydroxy-20-oxo-4,6-pregnadieno-[3,2-c]pyrazole 21-acetate, which is isolated by crystallization of the appropriate eluate.

In accordance with the above procedure, but using an equivalent quantity of any other acylating agent in place of the acetic anhydride, there is obtained the corresponding N-propionyl-9α,11β-dichloro - 17α,21 - dihydroxy-20-oxo-4,6-pregnadieno-[3,2-c]pyrazole 21-acylate.

In accordance with the above procedures, but starting with the 9α,11β-dichloro-17α,21-dihydroxy - 20 - oxo-4,6-pregnadieno-[3,2-c]pyrazole and using two equivalents of another acylating agent there is obtained the corresponding N-acyl-21-acylate thereof.

A solution of 5.73 g. of N-propionyl-9α,11β-dicholro-17α,21 - dihydroxy-20-oxo - 4,6 - pregnadieno[3,2-c]pyrazole 21-acetate in 60 ml. of 80% (v./v.) acetic acid is refluxed for 1.5 hours. This solution is diluted with 400 ml. of ice-water and extracted with ethyl acetate. The ethyl acetate extract is washed with water and with saturated sodium bicarbonate solution, dried, and evaporated to dryness in vacuo. Recrystallization of the resulting product affords 9α,11β-dichloro-17α,21-dihydroxy-20-oxo-4,6-pregnadieno-[3,2-c]pyrazole 21-acetate.

To a solution of 85 mg. of N-propionyl-9α,11β-dichloro-17α,21-dihydroxy-20-oxo-4,6 - pregnadieno-[3,2-c]pyrazole in 0.5 ml. of pyridine, cooled to 0° C., is added 0.015 ml. of methane sulfonyl chloride. The resulting mixture is allowed to stand at a temperature of approximately 0° C. for a period of approximately 1 hour. Water is then added to the reaction mixture and the precipitate which forms is recovered by filtration, washed with water, and dried to give N-propionyl-9α,11β-dichloro-17α,21-dihydroxy - 20 - oxo - 4,6-pregnadieno-[3,2-c]pyrazole 21-mesylate.

To 180 mg. of N-propionyl-9α,11β-dichloro-17α,21-dihydroxy-20-oxo-4,6-pregnadieno-[3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. The material which precipitates is recovered by filtration, washed with water, and dried to give N-propionyl-9α,11β-dichloro-17α - hydroxy-21-iodo-20-oxo-4,6-pregnadieno-[3,2-c]pyrazole.

A 500 mg. aliquot of the above product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give N-propionyl-9α,11β-dichloro-17α-hydroxy-21-iodo-20-oxo-4,6-pregnadieno-[3,2-c-]pyrazole.

The N-propionyl-9α,11β-dichloro-17α-hydroxy-21-iodo-20-oxo-4,6-pregnadieno-[3,2-c]pyrazole is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and the material which separates is recovered by filtration. The product is washed with water, dried and recrystallized from ethyl acetate to give N-propionyl-9α,11β-dichloro-17α-hydroxy-20 - oxo - 4,6 - pregnadieno-[3,2-c]pyrazole.

To a solution of 62 mg. of N-propionyl-9α,11β-dichloro-17α,21-dihydroxy-20-oxo-4,6 - pregnadieno-[3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is then added to the cooled solution and the product is extracted into chloroform, dried over sodium sulfate and evaporated to dryness. The resulting product is a mixture of N-propionyl-9α,11β-dichloro-17α,21-epoxy-20-oxo-4,6-pregnadieno-[3,2-c]pyrazole and N-propionyl-9α,11β-dichloro-21-fluoro-17α-hydroxy-20-oxo-4,6-pregnadieno-[3,2-c]pyrazole, which compounds are separated by partition chromatography or by chromatography on silica gel.

A 500 mg. aliquot of the crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give N-propionyl-9α,11β-dichloro-21-fluoro-17α-hydroxy-20-oxo-4,6-pregnadieno-[3,2-c]pyrazole.

In accordance with the above procedures, but starting with the 9α-bromo-11β-chloro-17α,21-dihydroxy-4,6-pregnadiene-3,20-dione in place of the 9α,11β-dichloro-17α-21-dihydroxy-4,6-pregnadiene-3,20-dione there are obtained as products the corresponding 9α-bromo-11β-chloro-17α,21-dihydroxy-20-oxo-4,6-pregnadieno-[3,2-c]pyrazole and the N-acyl-, the 21-acylate, and the N-acyl-21-acylate derivatives thereof in which the two acyl groups may be the same or different; the 9α-bromo-11β-chloro-17α-hydroxy-20-oxo-4,6-pregnadieno-[3,2-c]pyrazole and the N-acyl derivative thereof; and the 9α-bromo-11β-chloro-21-fluoro-17α-hydroxy-20-oxo-4,6-pregnadieno-[3,2-c]pyrazole and the N-acyl derivatives thereof.

The 9α,11β-dichloro-17α,21-dihydroxy-4,6-pregnadiene-3,20-dione and the 9α-bromo-11β-chloro-17α,21-dihydroxy-4,6-pregnadiene-3,20-dione compounds, as well as the substituted derivatives thereof in columns 2–4, used as starting materials can be obtained in the following manner, starting from the corresponding 17α,21-dihydroxy-4-pregnene-3,20-dione.

A solution of 400 mg. of 17α,21-dihydroxy-4-pregnene-3,20-dione in 2.0 ml. dimethyl formamide, 0.8 ml. of pyridine and 0.4 ml. of methanesulfonyl chloride is allowed to stand at 75° C. for one hour. The mixture is cooled and water is added. The precipitate formed is filtered, washed with water, dried in air and purified by chromatography on alumina and elution with benzene. Crystallization gives 17α,21-dihydroxy-4,9(11)-pregnadiene-3,20-dione.

To a solution of 100 mg. of 17α,21-dihydroxy-4,9(11)-pregnadiene-3,20-dione in 2 ml. of pyridine is added one milliequivalent of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. in vacuo to afford the 17α,21-dihydroxy-4,9(11)-pregnadiene-3,20-dione 21-acetate which is isolated by the addition of water and filtration.

To a stirred, cooled (0.5° C.) solution of 17α,21-dihydroxy-4,9(11)-pregnadiene-3,20-dione-21-acetate (1.0 g.) and lithium chloride (4.0 g.) in glacial acetic acid (40 ml.) is added N-chlorosuccinimide (383 mg., 1.1 equivalent) followed immediately by an anhydrous solution of hydrogen chloride (104 mg.) in tetrahydrofuran (1.0 ml.). Stirring is continued at room temperature for 3 hours, and the reaction mixture is poured into water (400 ml.). The resulting mixture is filtered and the residue is washed with water, and dried to yield a crude product. Crystallization from acetone gives 9α,11β-dichloro-17α,21-dihydroxy-4-pregnene-3,20-dione 21-acetate.

A suspension of 9α,11β-dichloro-17α,21-dihydroxy-4-pregnene-3,20-dione 21-acetate (1.0 g.) in 0.27 N methanolic perchloric acid (70 ml.) is stirred at room temperature for 17 hours. The reaction mixture is then poured into water (200 ml.) and filtered. The residue is washed with water and dried, giving a crude product, which is crystallized from acetone to yield 9α,11β-dichloro-17α,21-dihydroxy-4-pregnene-3,20-dione.

To a stirred, cooled (0–5° C.) solution of 17α,21-dihydroxy-4,9(11)-pregnadiene-3,20-dione 21-acetate (1.0 g.) and lithium chloride (4.0 g.) in glacial acetic acid (40 ml.) is added N-bromoacetamide (395 mg.) followed immediately by an anhydrous solution of hydrogen chloride (104 mg.) in tetrahydrofuran (1.0 ml.). Stirring is continued at room temperature for 3 hours, and the reaction mixture is precipitated with water and filtered. The residue is washed with water, and dried to yield a crude product. Crystallization from acetone gives 9α-bromo-11β-chloro-17α,21-dihydroxy-4-pregnene-3,20-dione 21-acetate.

A suspension of 9α-bromo-11β-chloro-17α,21-dihydroxy-4-pregnene-3,20-dione 21-acetate (1.0 g.) in 0.27 N methanolic perchloric acid (70 ml.) is stirred at room temperature for 17 hours. The reaction mixture is then precipitated with water and filtered. The residue is washed with water and dried, giving a crude product which is recrystallized from acetone to yield 9α-bromo-11β-chloro-17α,21-dihydroxy-4-pregnene-3,20-dione.

To a solution of 100 mg. of 9α,11β-dichloro-17α,21-dihydroxy-4-pregnene-3,20-dione compound in 2 ml. of pyridine is added one milliequivalent of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. in vacuo to afford the 9α,11β-dichloro-17α,21-dihydroxy-4-pregnene-3,20-dione 21-acetate which is isolated by the addition of water and filtration.

A suspension containing 300 mg. of 9α,11β-dichloro-17α,21-dihydroxy-4-pregnene-3,20-dione 21-acetate, 700 mg. of chloranil, 8.3 ml. of ethyl acetate and 1.7 ml. of acetic acid is refluxed for 17 hours under nitrogen. The reaction mixture is diluted with 40 ml. of ethyl acetate and filtered. The filtrate is washed sequentially with two 20 ml. portions of ice cold 10% aqueous sodium bisulfite solution, three 20 ml. portions of ice cold 5% aqueous potassium hydroxide solution and finally washed to neutrality with several 20 ml. portions of ice water. The aqueous washes are re-extracted with 50 ml. of ethyl acetate and treated as above. The combined organic phase is dried over sodium sulfate and concentrated in vacuo. The crude material dissolved in benzene is chromatographed on 15 g. of acid washed alumina. Elution with chloroform:ether 2:8 affords 9α,11β-dichloro-17α,21-dihydroxy-4,6-pregnadiene-3,20-dione 21-acetate. This product is then hydrolyzed by treatment with a solution of potassium bicarbonate in aqueous methanol to form 9α,11β-dichloro-17α,21-dihydroxy-4,6-pregnadiene-3,20-dione.

*Example 6*

A 5 g. sample of 9α-fluoro-11β,17α,21-trihydroxy-16α-methyl-4,6-pregnadiene-3,20-dione is dissolved in a mixture of 235 ml. of chloroform and 150 ml. of methylene chloride, cooled in an ice bath with stirring and treated with 85 ml. of formaldehyde (37%). An equal volume (85 ml.) of cold concentrated hydrochloric acid is added from a funnel over a 5-minute interval with stirring and cooling. The mixture is stirred at room temperature for four hours. The layers are separated and the organic layer is washed free of acid by washing three times with water and then with a 5% solution of sodium bicarbonate. The organic layers are washed free of bicarbonate, dried over magnesium sulfate and taken to dryness. The gummy residue is treated with enough hot methanol on a steam bath to effect trituration, and the resulting crystalline solid is separated by filtering the mixture while hot. (The filtrate is set aside and may deposit additional product overnight.) The crude product is dried to constant weight and purified by chromatography. The product is partially dissolved in 250 ml. of hot chloroform and diluted with an equal volume of hot benzene to complete solution. After cooling, the mixture is adsorbed in 100 g. of basic alumina and eluted with benzene and chloroform to give 17a,20,20,21-bis(methylenedioxy) - 9α - fluoro - 16α - methyl-11β-hydroxy-4,6-pregnadiene-3-one.

The 17α,20,20,21-bis(methylenedioxy) - 9α - fluoro-16α-methyl - 11β - hydroxy-4,6-pregnadiene-3-one (3.25 g.) is dissolved in 76 ml. of dry pyridine and added to a cold solution prepared by the cautious addition of 3.25 g. of chromium trioxide (in portions) to 34.7 ml. of cold pyridine. The mixture is allowed to stand at room temperature overnight. The mixture is poured into water and extracted three times with ethyl acetate, avoiding excessive shaking especially during the third extraction. The combined ethyl acetate extracts are washed three times with 1 N sulfuric acid and then with water until neutral. The combined ethyl acetate extracts are dried over magnesium sulfate and taken to dryness to give 2.94 g. of product. The product is dissolved in benzene, adsorbed on basic alumina and eluted with 8:2 benzene:chloroform to give 17α,20,20,21-bis(methylenedioxy)-9α-fluoro-16α-methyl - 4,6 - pregnadiene-3,11-dione.

A 2.60 g. sample of 17α,20,20,21-bis(methylenedioxy)-9α-fluoro-16α-methyl-4,6-pregnadiene-3,11-dione is dissolved in 95 ml. of dry benzene using dry equipment and treated with 2.43 ml. of freshly distilled ethyl formate. About 1.19 g. of a dispersion of sodium hydride in mineral oil (about 51%) is added, followed by about 1.19 g. of freshly prepared dry sodium methoxide (dried at about 175° C. oil pump for 4 hours). The air in the system is again replaced with nitrogen and the mixture, which turns yellow at once, is stirred at room temperature for one and one-half hours. At this point the color of the reaction mixture is a dark orange. The mixture is chilled in an ice bath and a cold, saturated solution of sodium dihydrogen phosphate is added generally to decompose excess sodium hydride and neutralize the sodium methoxide. Ether is added and the layers are separated. The aqueous layers are back-extracted with ether and the combined organic layers are washed free of acid with water and then extracted three to four times with a 5% aqueous solution of sodium bicarbonate. These extracts are set aside. The product is now extracted four to five times with a cold 2% aqueous solution of sodium hydroxide. (In order to avoid emulsification, the aqueous alkali is gently poured into the separatory funnel and the layers are separated without shaking the funnel. The last two extracts may be shaken with care.) The dark liquor is back-extracted two times with ether, and finally acidified in the cold with saturated aqueous solution of sodium dihydrogen phosphate. The neutral ether-benzene fraction should be set aside and processed as described below. The product is extracted into ether, and the ether extracts are washed free of acid with a saturated solution of sodium chloride. After drying over magnesium sulfate, the ether solution is taken to dryness and the amorphous product is crystallized from methanol to give 17α,20,20,21-bis(methylenedioxy)-9α-fluoro-2-hydroxy-methylene - 16α - methyl - 4,6 - pregnadiene-3,11-dione. This material is satisfactory for use in the next step.

A 1.00 g. aliquot of 17α,20,20,21-bis(methylenedioxy)-9α-fluoro - 2 - hydroxymethylene - 16α - methyl-4,6-pregnadiene-3,11-dione is suspended in 44 ml. of absolute ethanol and treated with 0.38 ml. of hydrazine hydrate (99–100%). The air in the system is replaced with nitrogen and the mixture is quickly brought to the reflux temperature. After refluxing for one hour the mixture is taken to dryness; the residual oil is treated with water and the resulting amorphous solid is removed by filtration, washed thoroughly with water and dried. The yield is about 900 mg. The crude product is dissolved in absolute ethanol and concentrated in vacuo until the solid separates. The solid is redissolved by heating, and then allowed to crystallize slowly to afford 17α,20,20,21-bis(methylenedioxy) - 9α - fluoro - 16α - methyl-11-oxo-4,6-pregnadieno-[3,2-c]pyrazole.

A 455 mg. aliquot of 17α,20,20,21-bis(methylenedioxy)-9α-fluoro-16α-methyl-11-oxo - 4,6 - pregnadieno-[3,2-c]-pyrazole is suspended in 75 ml. of a solution of sodium borohydride in isopropanol which is prepared by suspending an excess of sodium borohydride in isopropanol, stirring vigorously for about 15 minutes, and filtering to separate the excess of sodium borohydride. To the suspension is added an 0.816 ml. aliquot of a solution of 0.55 ml. of triethylamine in 1.45 ml. of isopropanol. The mixture is stirred, and enough methylene chloride (about 30 ml.) is added, with cooling, to make the system homogeneous. One drop of water (ca. ½₀ ml.) is added and the mixture is stirred in a nitrogen atmosphere at room temperature over-night. Insolubles generally separate out in the course of the reaction. The mixture is then cooled, and the excess of sodium borohydride is decomposed by the addition of cold 2.5 N hydrochloric acid. The mixture (pH ca. 5) is taken to dryness in vacuo and the residue is washed with water and dried to give 17α,20,20,21-bis(methylenedioxy)-9α - fluoro - 11β - hydroxy-16α-methyl-4,6-pregnadieno-[3,2-c]-pyrazole.

To a solution of 100 mg. of 17α,20,20,21-bis(methylenedioxy)-9α-fluoro-11β-hydroxy-16α-methyl - 4,6 - pregnadieno-[3,2-c]pyrazole in 2 ml. of pyridine is added 0.5 ml. of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate is then distilled at about 40° C. in vacuo to afford the N-acetyl-17α,20,20,21-bis(methylenedioxy) - 9α - fluoro-11β-hydroxy-16α-methyl-4,6-pregnadieno-[3,2-c] - pyrazole which is isolated by the addition of water and filtration.

In accordance with the above procedure, but using an equivalent quantity of another acylating agent in place of acetic anhydride, there is obtained the corresponding N-acyl derivative.

The N-acetyl-17α-20,20,21 - bis(methylenedioxy) - 9α-fluoro-11β-hydroxy-16α-methyl-4,6-pregnadiene - [3,2-c]-pyrazole (25 mg.) is heated on a steam bath with 5 cc. of a 60% aqueous solution of formic acid for about 30 minutes. The excess reagent is removed under reduced pressure using a water bath at about 50° C. as the source of heat. The residue is flushed with n-hexane. The residue is then dissolved in acetone and precipitated with n-hexane to give an amorphous solid which is a mixture of N-acetyl-9α-fluoro-11β,17α,21-trihydroxy-16α-methyl-20-oxo-4,6 - pregnadieno - [3,2-c]pyrazole and N-acetyl-9α-fluoro-21-formyloxy-11β,17α - dihydroxy - 16α-methyl-20-oxo-4,6-pregnadieno - [3,2 - c]pyrazole, which compounds are separated by chromatography.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 9α-fluoro-11β,17α-21-trihydroxy-16α-methyl-20-oxo-4,6 - pregnadieno-[3,2-c]pyrazole.

To a solution of 100 mg. of N-acetyl-9α-fluoro-11β, 17α,21-trihydroxy-16α-methyl-20-oxo - 4,6 - pregnadieno-[3,2-c]pyrazole in 2 ml. of pyridine is added one milliequivalent of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. in vacuo. The N-acetyl-9α-fluoro-11β,17α,21-trihydroxy-16α - methyl-20-oxo-4,6-pregnadieno[3,2 - c]pyrazole 21 - acetate is then isolated by addition of water and filtration.

In accordance with the above procedure, but using an equivalent quantity of another acylating agent in place of acetic anhydride, there is obtained the corresponding N-acetyl-9α-fluoro-11β,17α,21 - trihydroxy - 16α - methyl-20-oxo-4,6-pregnadieno-[3,2-c]pyrazole 21-acylate.

In accordance with the above procedure, but starting with the 9α-fluoro-11β,17α,21-trihydroxy-16α-methyl-20-oxo-4,6-pregnadieno-[3,2-c]pyrazole and using two milliequivalents of another acylating agent, there is obtained the corresponding N-acyl-21-acylate thereof.

A solution of 5.73 g. of N-acyl-9α-fluoro-11β,17α,21-trihydroxy-16α-methyl-20-oxo-4,6-pregnadieno - [3,2 - c]-pyrazole 21-acetate in 60 ml. of 80% (v./v.) acetic acid is refluxed for 1.5 hours. This solution is diluted with 400 ml. of ice-water and extracted with ethyl acetate. The ethyl acetate extract is washed with water and with saturated sodium bicarbonate solution, dried, and evaporated to dryness in vacuo. Recrystallization of the resulting product affords 9α-fluoro-11β,17α,21-trihydroxy-16α-methyl-20-oxo-4,6-pregnadieno-[3,2-c]pyrazole 21 - acetate.

To a solution of 85 mg. of N-acetyl-9α-fluoro-11β,17α,21-trihydroxy-16α-methyl-20-oxo-4,6-pregnadieno - [3,2 - c]-pyrazole in 0.5 ml. of pyradine, cooled to 0° C., is added 0.015 ml. of methane sulfonyl chloride. The resulting mixture is allowed to stand at a temperature of approximately 0° C. for a period of approximately 1 hour. Water is then added to the reaction mixture and the precipitate which forms is recovered by filtration, washed with water, and dried to give N-acetyl-9α-fluoro-11β-17α, 21-trihydroxy-16α-methyl-20-oxo-4,6-pregnadieno-[3,2-c]-pyrazole 21-mesylate.

To 180 mg. of N-acetyl-9α-fluoro-11β,17α,21-trihydroxy - 16α - methyl-20-oxo-4,6-pregnadieno-[3,2-c]pyrazole 21-mesylate dissolved in 10 ml. of acetone is added 300 mg. of sodium iodide. The resulting mixture is heated at reflux temperature for a period of approximately one hour, and the reaction solution is cooled to room temperature and diluted with water. The material which precipitates is recovered by filtration, washed with water, and dried to give N-acetyl-9α-fluoro-11β,17α-dihydroxy-21 - iodo - 16α - methyl-20-oxo-4,6-pregnadieno-[3,2-c] pyrazole.

The N - acetyl - 9α-fluoro-11β,17α-dihydroxy-21-iodo-16α - methyl - 20-oxo-4,6-pregnadieno-[3,2-c]pyrazole is dissolved in a mixture of 5 ml. of water and 5 ml. of ethanol. To the resulting suspension is added 500 mg. of sodium bisulfite, and the mixture is heated under reflux for a period of about 1 hr. The reaction solution is cooled, diluted with water, the material which separates is recovered by filtration. The product is washed with water, dried and recrystallized from ethyl acetate to give N - acetyl - 9α - fluoro-11β,17α-dihydroxy-16α-methyl-20-oxo-4,6-pregnadieno-[3,2-c]pyrazole.

A 500 mg. aliquot of the above product is dissolved in 2.4 ml. of pure methanol and allowed to react with 0.9 ml. of 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 9α-fluoro-11β,17α-dihydroxy - 16α - methyl - 20-oxo-4,6-pregnadieno-[3,2-c] pyrazole.

To a solution of 62 mg. of N-acetyl-9α-fluoro-11β,17α,-21 - trihydroxy - 16α - methyl-20-oxo-4,6-pregnadieno-[3,2-c]pyrazole 21-mesylate in 1 ml. of freshly distilled anhydrous dimethyl-formamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of N - acetyl-17α,21-epoxy-9α-fluoro-11β-hydroxy-16α - methyl-20-oxo-4,6-pregnadieno-[3,2-c]pyrazole and N - acetyl - 9α,21 - difluoro - 11β,17α - dihydroxy-16α-methyl - 20 - oxo-4,6-pregnadieno-[3,2-c]pyrazole which compounds are separated by partition chromatography, or by chromatography on silica gel.

A 500 mg. aliquot of the above product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 9α,21-difluoro-17α,21 - dihydroxy - 16α-methyl-20-oxo-4,6-pregnadieno-[3,2-c]pyrazole.

In accordance with the above procedures, but starting with the 9α,-fluoro-11β,17α,21-trihydroxy-16-methylene-4,6-pregnadiene-3,20-dione in place of the 9α-fluoro-11β,-17α,21 - trihydroxy - 16α - methyl-4,6-pregnadiene-3,20-dione, there are obtained as products the corresponding 9α - fluoro - 11β,17α,21-trihydroxy-16-methylene-11,20-dioxo-4,6-pregnadieno-[3,2-c]pyrazole and the N-acyl-, the 21-acylate, and the N-acyl-21-acylate derivatives thereof in which the two acyl groups may be the same or different; the 9α - fluoro-17α,21-dihydroxy-16-methylene-11,20-dioxo-4,6-pregnadieno-[3,2-c]pyrazole and the N-acyl derivative thereof, and the 9α,21-difluoro-11β,17α-dihydroxy - 16 - methylene-11,20-dioxo-4,6-pregnadieno-[3,2-c]pyrazole and the N-acyl derivates thereof.

A 500 mg. aliquot of the above product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 9α-,21-difluoro-17α,21-dihydroxy - 16α - methyl - 20 - oxo - 4,6 -pregnadieno-[3,2-c]pyrazole.

*Example 7*

About 6 g. of 17α,20,20,21-bis(methylenedioxy)-11β-hydroxy-16α-methyl-4,6-pregnadiene-3-one (Example 4) is suspended in about 35 ml. of dry benzene, and to this suspension is added 6 ml. of ethyl formate and about 1 g. of freshly prepared sodium methoxide The mixture is allowed to stand at room temperature under nitrogen for 1½ hours and is then cooled in an ice bath. The mixture is then acidified with an excess of a saturated aqueous solution of potassium dihydrogen phosphate. Ether is added and the product is extracted several times with a 2% aqueous solution of sodium hydroxide. The extracts are back-extracted with ether which is acidified with cold 2.5 N HCl, and then extracted with methylene chloride. The methylene chloride extracts are washed with aqueous saturated sodium chloride solution, dried over magnesium sulfate and then taken to dryness. The resulting product is crystallized with ether:petroleum ether to give 17α,20,-20,21 - bis(methylenedioxy) - 11β - formyloxy - 2 - hydroxymethylene-16α-methyl-4,6-pregnadiene-3-one.

To 1.422 g. of 17α,20,20,21-bis(methylenedioxy)-11β,-formyloxy - 2 - hydroxymethylene - 16α - methyl-4,6-pregnadiene-3-one, suspended in 18 ml. of absolute ethanol, is added 0.45 ml. of phenylhydrazine. The reaction mixture is refluxed for 40 minutes under nitrogen and then cooled. The 17α,20,20,21 - bis(methylenedioxy)-11β - formyloxy - 16α-methyl-2'-phenyl-4,6-pregnadieno-[3,2-c]pyrazole, which is formed as the major product, separates out and is recrystallized.

The 17α,20,20,21 - bis(methylenedioxy) - 11β - formyloxy - 16α - methyl - 2' - phenyl-4,6-pregnadieno-[3,2-c]pyrazole (720 mg.) is heated in a steam bath with 24 ml. of a 60% aqueous solution of formic acid for about 30 minutes. The excess reagent is removed in vacuo using a water bath at about 50° C. as the source of heat. The residue is flushed four times with n-hexane and then dried at 60° C. in high vacuum to give a solid which is a mixture of 11β,17α,21-trihydroxy-16α-methyl-20-oxo-2'-phenyl-4,6-pregnadieno-[3,2-c]pyrazole and 11β,17α,21-trihydroxy - 16α - methyl - 20 - oxo - 2' - phenyl - 4,6-pregnadieno-[3,2-c]pyrazole 21-formate.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 11β,17α,21 - trihydroxy - 16α - methyl-20-oxo-2'-phenyl-4,6-pregnadieno-[3,2-c]pyrazole.

*Example 8*

To a solution of 0.5 millimole of 17α,20,20,21-bis-(methylenedioxy - 11β - hydroxy - 2 - hydroxymethylene-16α-methyl-4,6-pregnadiene-3-one (Example 4) in about 3 ml. of absolute ethanol is added 0.6 millimole of sodium acetate and then 0.6 millimole of methylhydrazine sulfate. The mixture is refluxed under nitrogen for 40 minutes and then filtered hot. The filtrate is taken to dryness, water is added, and the 17a,20,20,21-bis(methylenedioxy)-N,16α - dimethyl - 11β - hydroxy-4,6-pregnadieno-[3,2-c] pyrazole which is formed as the major component is removed by filtration.

Alternately, a mixture of 1',16α-dimethyl-, and 2',16α-dimethyl - 17α,20,20,21 - bis(methylenedioxy) - 11β - hydroxy-4,6-pregnadieno-[3,2-c]pyrazole is prepared by heating 17α,20,20,21-bis(methylenedioxy)-11β-hydroxy-2 - hydroxymethylene - 16α-methyl-4,6-pregnadiene-3-one with methanol in the presence of p-toluenesulfonic acid to form the 17α,20,20,21-bis(methylenedioxy)-11β-hydroxy - 2 - methoxymethylene-16α-methyl-4,6-pregnadiene-3-one, and then reacting the latter compound with methylhydrazine, following the detailed procedures given in Example 10, but using methylhydrazine instead of phenylhydrazine. The components of the mixture are separated by chromatography.

In accordance with all the above procedures, but using other alkyl substituted hydrazines such as ethyl-, β-hydroxyethyl-, propyl-, butylhydrazines, and the like, in place of methylhydrazine, there are obtained the corresponding 1'-alkyl- and 2'-alkyl-17α,20,20,21-bis(methylenedioxy) - 11β - hydroxy - 16α - methyl-4,6-pregnadieno-[3,2-c]pyrazoles.

Alternately the 17α,20,20,21-bis(methylenedioxy)-N, 16α - dimethyl - 11β - hydroxy - 4,6 - pregnadieno-[3,2-c] pyrazoles may be prepared by the following procedure:

The 17α,20,20,21-bis(methylenedioxy)-11β-hydroxy-2-hydroxymethylene - 16α - methyl-4,6-pregnadiene-3-one is dissolved in 9.2 ml. of absolute ethanol and treated with a solution of 0.16 ml. of hydrazine hydrate dissolved in 0.16 ml. of absolute ethanol. The mixture is refluxed in a nitrogen atmosphere for about 45 minutes and then evaporated to dryness under reduced pressure. The residue is washed three times with cold water and the resulting amorphous solid is dried at 80° C. for one hour in high vacuum to give 17α,20,20,21-bis(methylenedioxy)-11β-hydroxy-16α-methyl-4,6-pregnadieno-[3,2-c]pyrazole.

A solution of about 0.47 millimole of 17α,20,20,21-bis(methylenedioxy) - 11β - hydroxy-16α-methyl-4,6-pregnadieno-[3,2-c]pyrazole in 10 ml. of benzene is treated with about 30–38 mg. of about 51% sodium hydride (in oil suspension). After the addition of 2–3 ml. of dimethylformamide (dried over calcium hydride) and 5 ml. of methyl iodide, the mixture is stirred at room temperature overnight. The product is filtered, washed with methylene chloride, and the filtrate and washings are taken to dryness. The residue is treated with water and the product is filtered to afford as a major component the 17α,20,20,21-bis(methylenedioxy)-11β-hydroxy-N,16α-dimethyl-4,6-pregnadieno-[3,2-c]pyrazole.

In accordance with the above procedure, but using another alkylating agent, for example, ethyl iodide, propyl iodide and the like, in place of the methyl iodide, there is obtained the corresponding 2 N-alkyl-17α,20,20,21-bis(methylenedioxy) - 11β - hydroxy-16α-methyl-4,6-pregnadieno-[3,2-c]pyrazole.

The 17α,20,20,21-bis(methylenedioxy)-11β-hydroxy-2', 16α-dimethyl-4,6-pregnadieno-[3,2-c]pyrazole (15 mg.) is heated on a steam bath with 1 ml. of 60% formic acid for about 20 minutes and then filtered hot. The filtrate is taken to dryness, water is added, and a mixture of the 11β,17α,21-trihydroxy-2',16α-dimethyl-20-oxo-4,6-pregnadieno-[3,2-c]pyrazole and its 21-formate is recovered by filtration. A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 11β,17α,21-trihydroxy-2',16α-dimethyl-20-oxo-4,6-pregnadieno-[3,2-c]pyrazole.

To a solution of 100 mg. of 11β,17α,21-trihydroxy-2', 16α-dimethyl-20-oxo-4,6-pregnadieno-[3,2-c]pyrazole in 2 ml. of pyridine is added one milliequivalent of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. in vacuo. The 11β,17α,21-trihydroxy-2', 16α - dimethyl - 20 - oxo - 4,6-pregnadieno-[3,2-c]pyrazole 21-acetate is then isolated by addition of water and filtration.

In accordance with the above procedure, but using an equivalent quantity of another acylating agent in place of acetic anhydride, there is obtained the corresponding 11β,17α,21 - trihydroxy - 2',16α-dimethyl-20-oxo-4,6-pregnadieno-[3,2-c]pyrazole 21-acylate.

To a solution of 85 mg. of 11β,17α,21-trihydroxy-2',16α-dimethyl-20-oxo-4,6-pregnadieno - [3,2-c]pyrazole in 0.5 ml. of pyridine, cooled to 0° C., is added 0.015 ml. of methane sulfonyl chloride. The resulting mixture is allowed to stand at a temperature of approximately 0° C. for a period of approximately 1 hour. Water is then added to the reaction mixture and the precipitate which forms is recovered by filtration, washed with water, and dried to give 11β,17α,21-trihydroxy-2',16α-dimethyl-20-oxo-4,6-pregnadieno - [3,2-c]pyrazole 21-mesylate.

To 180 mg. of 11β,17α,21-trihydroxy-2',16α-dimethyl-20-oxo-4,6-pregnadieno-[3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. The material which precipitates is recovered by filtration, washed with water, and dried to give 11β,17α - dihydroxy-21-iodo-2',16α-dimethyl-20-oxo-4,6-pregnadieno-[3,2-c]pyrazole.

The 11β,17α-dihydroxy-21-iodo - 2',16α - dimethyl-20-oxo-4,6-pregnadieno-[3,2-c]pyrazole is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and the material which separates is recovered by filtration. The product is washed with water, dried and recrystallized from ethyl acetate to give 11β,17α-dihydroxy - 2',16α - dimethyl-20-oxo-4,6-pregnadieno-[3,2-c]pyrazole.

To a solution of 62 mg. of 11β,17α,21-trihydroxy-2',16α-dimethyl-20-oxo-4,6-pregnadieno - [3,2-c]pyrazole 21-mesylate in 1 ml. of freshly distilled anhydrous dimethyl-formamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of 17α,21-epoxy-11β-hydroxy-2',16α-dimethyl-20-oxo - 4,6 - pregnadieno-[3,2-c]pyrazole and 21-fluoro-11β,17α-dihydroxy-2',16α-dimethyl-20-oxo-4,6-pregnadieno - [3,2-c]pyrazole, which compounds are separated by partition chromatography, or by chromatography on silica gel.

In accordance with the above procedures beginning with the 2'-methyl-17α,20,20,21-bis(methylenedioxy)-11β-hydroxy-4,6-pregnadieno-[3,2-c]pyrazole, but using the 1'-methyl-derivative in place of the 2'-methyl-derivative, there are obtained the corresponding 1'-methyl-compounds.

In accordance with all of the above procedures, but starting with the 17α,20,20,21-bis(methylenedioxy)-2-hydroxymethylene - 4,6 - pregnadiene-derivative which is obtained from each of the starting materials which are listed in columns 2–4, there are obtained the corresponding 1'-methyl-and 2'-methyl derivative.

Example 9

To 200 mg. of 17α,20,20,21-bis(methylenedioxy)-11β-hydroxy-2-hydroxymethylene-16α-methyl - 4,6 - pregnadiene-3-one (Example 4) in 7 cc. of absolute ethanol is added 82 mg. of sodium acetate and then 102 g. of cyclohexylhydrazine oxalate. The mixture is refluxed under nitrogen for one hour. The insolubles are removed by filtration. The filtrate is taken to dryness. The residue is dissolved in 3 cc. of ether and the ether solution is washed successively with 2% aqueous sodium hydroxide and then with water to neutrality. The ether solution is then dried over magnesium sulfate, filtered and taken to dryness to give a residue which has as the major component the N-cyclohexyl - 17α,20,20,21 - bis(methylenedioxy) - 11β-hydroxy-16α-methyl-4,6-pregnadieno-[3,2-c]pyrazole.

Alternately, a mixture of 1'-cyclohexyl-and the 2'-cyclohexyl - 17α,20,20,21 - bis(methylenedioxy) - 11β-hydroxy-4,6-pregnadieno-[3,2-c]pyrazole is prepared by heating 17α,-20,20,21-bis(methylenedioxy)-11β-hydroxy-2-hydroxymethylene - 16α - methyl-4,6-pregnadiene-3-one with methanol in the presence of p-toluenesulfonic acid to form the 17α,20,20,21-bis(methylenedioxy - 11β - hydroxy - 2 - methoxymethylene - 16α - methyl-4,6-pregnadiene-3-one, and then reacting the latter compound with cyclohexylhydrazine following the detailed procedures given in Example 10, but using cyclohexylhydrazine instead of phenylhydrazine. The components of the mixture are separated by chromatography.

A 150 mg. aliquot of the N-cyclohexyl-17α,-20,20,21-bis(methylenedioxy) - 11β-hydroxy-16α-methyl-4,6-pregnadieno-[3,2-c]pyrazole is heated under nitrogen with 5 cc. of a 60% aqueous solution of formic acid for about 40 minutes. The mixture is taken to dryness and water is then added. The product is extracted with chloroform, and the chloroform solution is washed with saturated aqueous sodium chloride solution, 5% aqueous sodium bicarbonate solution and then with water. The chloroform solution is dried over magnesium sulfate and then taken to dryness to give a residue. This is taken up in ether containing a little methanol, stirred with 75 mg. of Darco G-60 (a decolorizing charcoal), filtered and taken to dryness to give N-cyclohexyl-11β,-17α,21-trihydroxy-16α-methyl-20-oxo - 4,6 - pregnadieno-[3,2-c] pyrazole.

The 2'-cyclohexyl-11β,17α,21-trihydroxy-16α - methyl-20-oxo-4,6-pregnadieno-[3,2-c]pyrazole is converted into the 21-acetate, the 2'-cyclohexyl-11β,17α-dihydroxy-16α-methyl-20-oxo-4,6-pregnadieno-[3,2-c]pyrazole, and into the 2' - cyclohexyl - 21 - fluoro-11β,17α-dihydroxy-16α-methyl-20-oxo-4,6-pregnadieno - [3,2-c]pyrazole, following the detailed procedures given in Example 8 for the corresponding 2'-methyl-derivatives.

In accordance with the above procedures beginning with the 2'-cyclohexyl-17α,20,20,21-bis(methylenedioxy) 11β - hydroxy - 16α - methyl - 4,6 - pregnadieno - [3,2-c] pyrazole, but using the 1'-cyclohexyl-derivative in place of the 2'-cyclohexyl-derivative, there are obtained the corresponding 1'-cyclohexyl-compounds.

In accordance with all of the above procedures, but starting with the 17α,20,20,21-bis(methylenedioxy)-2-hydroxymethylene-4,6-pregnadiene derivative which is obtained from each of the starting materials which are listed in columns 2–4, there are obtained the corresponding 1'-cyclohexyl-and 2'-cyclohexyl-derivatives.

In accordance with the above procedures, but using other cycloalkylhydrazines in place of cyclohexylhydrazine there are obtained the corresponding 1'-and 2'-cycloalkyl derivatives.

Example 10

To a suspension of 25.0 g. of 11β,17α,21-trihydroxy-6,16α-dimethyl-4,6-pregnadiene-3,20-dione in 1.5 l. of alcohol-free chloroform cooled to about 5° C. in an ice bath is added with constant stirring 750 ml. of cold, concentrated hydrochloric acid and then 750 ml. of formalin (low in methanol). The mixture is removed from the ice bath and stirred at room temperature for 7 hours. The layers are separated and the aqueous phase is back-extracted twice with chloroform. The combined organic layers are washed twice with a 5% solution of sodium bicarbonate, and twice with a saturated salt solution. The solution is dried over magnesium sulfate and evaporated to dryness under reduced pressure. The residue is triturated with methanol to afford a crystalline solid. This material contains no detectable amount of starting material by paperstrip chromatography but shows two U.V. absorbing spots near the solvent front(methanol-formamide 2:1 vs. benzene-n-hexane 1:1). A 2.425 aliquot is recrystallized three times from a mixture of benzene and n-hexane to give 17α,20,20,21-bis(methylenedioxy)-11β-hydroxy-6,16α-dimethyl-4,6-pregnadiene-3-one which is used in the subsequent step of the synthesis without further purification.

17α,20,20,21 - bis(methylenedioxy)-11β-hydroxy-6,16α-dimethyl-4,6-pregnadiene-3-one (500 mg.) is dissolved in 25 cc. of benzene and then about 5 cc. of benzene is removed by distillation at normal pressure. The resulting solution is cooled to room temperature. Then 0.75 cc. of freshly distilled ethyl formate is added. The air in the system is replaced with nitrogen and 150 mg. of sodium hydride (as a 57% dispersion in mineral oil) is added. The mixture is stirred under nitrogen at room temperature for three hours. Then 15 cc. of a saturated aqueous solution sodium dihydrogen phosphate is added and the product is extracted into ether. The ether extracts are extracted with 2 N sodium hydroxide and the sodium hydroxide extracts are acidified with sodium dihydrogen phosphate and extracted again into ether. The ether extract is evaporated to dryness to give about 500 mg. of a crude product. From the ether solution there is obtained about 290 mg. of yellow crystals, M.P. 220–236° C. which is 17α,20,20,21-bis(methylenedioxy)-11β-formyloxy - 2 - hydroxy-methylene - 6,16α-dimethyl-4,6-pregnadiene-3-one. The analytical sample is recrystallized from ethyl acetate and has a melting point of 249–255° C., $\alpha_D^{27°}$ —217°, I.R. 5.81μ and 8.37μ. From the mother liquor is obtained about 127 mg. of 17α,20,20,21-bis(methylenedioxy)-11β - hydroxy - 2 - hydroxymethylene-6,16α-dimethyl-4,6-pregnadiene-3-one. The analytical sample is recrystallized from ether and has a melting point of 200–204° C., $\alpha_D^{27°}$, —197°, I.R. 6.05–6.2μ, and 6.4μ.

The 17α,20,20,21 - bis(methylenedioxy) - 11β - hydroxy-2-hydroxymethylene - 6,16α - dimethyl - 4,6-pregnadiene-3-one (1.19 g.) is dissolved in 25 cc. of ethanol. Three hundred mg. of phenyl hydrazine is added and the mixture is refluxed under nitrogen for one hour. About 25 cc. of water is added. The product is then extracted into 150 cc. of ether. The extracts are washed with 2 N HCl, with saturated sodium bicarbonate, water and saturated sodium chloride solution, and then dried over sodium sulfate and evaporated to dryness to give about 1.2 g. of crude product. On crystallization from ether there is obtained as a major component the 17α,20,20,21 - bis(methylenedioxy) - 11β - hydroxy - 6,16α-dimethyl-2'-pheneyl-4,6-pregnadieno-[3,2-c]pyrazole.

Alternately, a mixture of the 1'-phenyl- and 2'-phenyl-17α,20,20,21-bis(methylenedioxy) - 11β-hydroxy - 6,16α-dimethyl-4,6-pregnadieno-[3,2-c]pyrazole is prepared by the following route: A mixture of 1 gram of 17α,20,20,-21-bisi(methylenedioxy) - 11β - hydroxy-2-hydroxymethylene-6,16α-dimethyl-4,6-pregnadiene-3-one, 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated in vacuo. The 17α,20,20,21 - bis(methylenedioxy)-11β-hydroxy - 2 - methoxymethylene-6,16α-dimethyl-4,6-pregnadiene-3-one is obtained by direct crystallization or by chromatograpy on acid-washed alumina and elution with ether: chloroform mixtures.

A mixture of 500 mg. of 17α,20,20,21-bis(methylenedioxy) - 11β - hydroxy - 2 - methoxymethylene-6,16α-dimethyl-4,6-pregnadiene-3-one), 100 ml. of ethanol, and 1 ml. of phenylhydrazine is heated under nitrogen until dissolved, and then allowed to stand under nitrogeen at room temperature over night. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina. Elution with benzene affords a product which on recrystallization from a mixture of benzene and ethyl acetate affords the 17α,20,20,21-bis(methylenedioxy)-11β-hydroxy-6,16α - dimethyl - 1' - phenyl-4,6-pregnadien-[3,2-c]pyrazole. Further elution with a mixture of 1:1 ether: petroleum ether and crystallization from benzene, affords the 17α,20,20,21 - bis(methylenedioxy)-11β-hydroxy - 6,16α-dimethyl - 2' - phenyl-4,6 - pregnadieno - [3,2-c]pyrazole.

17α,20,20,21 - bis(methylenedioxy) - 11β-hydroxy-6,16α-dimethyl - 2' - phenyl - 4,6-pregnadieno-[3,2-c]pyrazole (430 mg.), is heated on a steam bath under nitrogen with 40 cc. of a 60% aqueous solution of formic acid for about 30 minutes. About 40 cc of water is added and the mixture is then extracted into 200 cc. of chloroform. The chloroform solution is washed with water, saturated sodium bicarbonate solution and water, then dried over sodium sulfate and evaporated under vacuum to give 430 mg. of crude product. This is dissolved in 60 cc. of absolute methanol, and 0.1 equivalent of sodium methoxide in methanol is added. The mixture is stirred under nitrogen at room temperature for 15 minutes. It is then acidified with acetic acid and the solvent is removed under vacuum at room temperature. About 20 cc. of water is added and the product is extracted into 150 cc. of ethyl acetate. The ethyl acetate solution is washed with saturated sodium bicarbonate and then with water. It is then dried over sodium sulfate and taken to dryness to give an amorphous solid.

The crude product obtained above is dried in high vacuum and then dissolved in 4 cc. of pyridine. About 3 cc of acetic anhydride is added. The mixture is then heated on the steam bath for about 15 minutes and then evaporated to dryness in vacuo. About 20 cc. of water is added. The product is then extracted into 150 cc. of ethyl acetate, washed with saturated sodium bicarbonate solution and water, and dried over sodium sulfate. The solvent is removed in vacuo to give a residue which is crystallized from ethyl acetate-benzene to yield about 250 mg. of 11β,17α,21-trihydroxy-6,16α-dimethyl-20-oxo-2'-phenyl-4,6-pregnadieno-[3,2-c]pyrazole 21-acetate.

One hundred mg. of 11β,17α,21-trihydroxy-6,16α-dimethyl-20-oxo-2'-4,6-pregnadieno-[3,2-c]pyrazole 21-acetate is dissolved in 10 cc. of absolute methanol, and 1.1 equivalents of sodium methoxide in methanol is added. The mixture is stirred at room temperature under nitrogen for 15 minutes. The product is acidified with acetic acid and then evaporated at room temperature under vacuum. The residue is then taken up in 100 cc. of chloroform, washed with water, saturated sodium bicarbonate solution, and water, and dried over sodium sulfate and evaporated to dryness to afford about 100 mg. of 11β,17α,-21-trihydroxy-6,16α - dimethyl - 20 - oxo - 2'-phenyl-4,6-pregnadieno-[3,2-c]pyrazole.

The crude 11β,17α,21 - trihydroxy -6,16α-dimethyl-20-oxo - 2' - phenyl - 4,6-pregnadieno-[3,2-c]pyrazole is dissolved in 1.2 cc. of dimethylformamide. The solution is cooled to 0° C. and 0.07 cc. of methane sulfonyl chloride is added. The mixture is kept at 0° C. for about one hour, 3 cc. of water is added and the product is extracted into 100 cc. of chloroform, washed with water, dried over sodium sulfate and taken to dryness to afford the crude 11β,17α,21 - trihydroxy - 6,16α-dimethyl-20-oxo-2'-phenyl-4,6-pregnadieno-[3,2-c]pyrazole 21-mesylate.

The 11β,17α,21 - trihydroxy - 6,16α-dimethyl-20-oxo-2'-phenyl-4,6-pregnadieno-[3,2-c]pyrazole 21-mesylate is suspended in 5.5 cc. of acetone and 117 mg. of sodium iodide is added. The mixture is refluxed under nitrogen for about one hour. It is then cooled on ice. On the addition of water there is formed a white precipitate which is filtered off, washed with water, and dried under vacuum to give the 11β,17α - dihydroxy - 21 - iodo - 6,16α-dimethyl - 20 - oxo-2'-phenyl-4,6-pregnadieno-[3,2-c]pyrazole.

The above material is dissolved in 5 cc. of ethanol.

Five hundred mg. of sodium bisulfite in 5 cc. of water is added, and the mixture is refluxed for one hour under nitrogen. Ten cc. of water is then added and the product is extracted into 100 cc. of chloroform, washed with water, dried over sodium sulfate and taken to dryness, to give about 100 mg. of residue which is purified by chromatography on silica gel. The 11β,-17α-dihydroxy-6,16α-dimethyl - 20 - oxo - 2'-phenyl-4,6-pregnadieno-[3,2-c]pyrazole so obtained (about 70 mg.) is crystallized from acetone-ether.

Silver dihydrogen phosphate is prepared by the reaction of 32 g. of trisilver phosphate with 10 ml. of 100% phosphoric acid with thorough mixing in a one-liter 3-necked round-bottomed flask. The silver dihydrogen phosphate is washed with two portions of diethyl ether, which are removed by decantation, to remove some of the phosphoric acid. About 200 ml. of acetonitrile are added to cover the silver dihydrogen phosphate, and the mixture is heated to reflux temperature. At this point 20 g. of 11β,17α-dihydroxy-21-iodo-6,16α-dimethyl-20-oxo - 2'-phenyl-4,6-pregnadieno-[3,2-c]pyrazole is added and the mixture is refluxed in a nitrogen atmosphere with stirring for 75 minutes. The reaction mixture is then cooled over a period of about one hour to room temperature. Then 200 g. of ice water are added, and the acetonitrile is removed in vacuo at a temperature below 25° C. The pH of the resulting aqueous suspension is adjusted to 6.4 by the addition of 23 ml. of saturated aqueous sodium carbonate solution. A precipitate is formed and separated by filtration. The precipitate is washed with water until no ultraviolet absorbing material is detected in the wash water. The filtrate and wash water are combined and freeze dried to separate a solid material from the water. The solid material is triturated with a total of 770 ml. of methanol in seven portions. The methanol-insoluble material is separated by filtration. The filtrate is then concentrated in vacuo to 200 ml. and passed through a column containing 60 g. of a cation exchange resin ("IR-120") in its hydrogen form. The column is washed with methanol until the washings contain no ultraviolet absorbing material. The combined eluate and washings are concentrated to a volume of 15 ml., and 150 ml. of ether are added. The precipitate which forms is recovered by filtration, washed with ether, and dried for about 16 hours in a desiccator, to give 11β,17α - dihydroxy - 6,16α - dimethyl - 20 - oxo - 2'-phenyl - 4,6 - pregnadieno - [3,2-c]pyrazole 21-dihydrogen phosphate.

The mono- and the dialkali metal salts of the 21-dihydrogen phosphate compound are obtained by neutralizing the 21-dihydrogen phosphate ester with an alkali metal methoxide.

To a solution of 62 mg. of 11β,17α,21-trihydroxy-6,16α - dimethyl-20 - oxo-2'-phenyl-4,6-pregnadieno-[3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of 17α,21-epoxy - 11β-hydroxy-6,16α - dimethyl-20 - oxo-2'-phenyl-4,6-pregnadieno-[3,2-c]pyrazole and 21 - fluoro-11β,17α-dihydroxy-6,16α-dimethyl-20 - oxo-2' - phenyl-4,6-pregnadieno-[3,2-c]pyrazole, which compounds are separated by partition chromatography, or by chromatography on silica gel.

In accordance with the above procedures beginning with the 2'-phenyl-17α,20,20,21 - bis(methylenedioxy)-11β-hydroxy-6,16α - dimethyl-4,6 - pregnadieno-[3,2-c]pyrazole, but using the 1'-phenyl-derivatives in place of the 2'-phenyl-derivatives, there are obtained the corresponding 1'-phenyl-compounds.

In accordance with all of the above procedures, but starting with the 17α,20,20,21-bis(methylenedioxy)-2-hydroxymethylene-4,6-pregnadiene-derivative which is obtained from each of the starting materials which are listed in columns 2–4, there are obtained the corresponding 1'-phenyl- and 2'-phenyl-derivatives.

*Example 11*

To a mixture of 223 mg. of 17α,20,20,21-bis-(methylenedioxy)-11β-hydroxy-2 - hydroxymethylene-16α-methyl-4,6-pregnadiene-3-one (Example 4) in 5 ml. of absolute ethanol is added 49 mg. of sodium acetate and then 95 mg. of p-tolylhydrazine hydrochloride. The mixture is refluxed under nitrogen for 45 minutes. On cooling, a solid precipitates which is filtered. The filtrate is taken to dryness and water is added. The product is filtered, washed with water, dilute acid, and again with water until neutral to afford a solid which has as the major component the 17α,20,20,21 - bis(methylenedioxy) - 11β - hydroxy-16α-methyl-2'-(p-tolyl)-4,6-pregnadieno-[3,2-c]pyrazole. The product is purified by dissolving 235 mg. of the crude material in 30 cc. of methanol and stirring at room temperature with 235 mg. of Nuchar C–1000–N (a decolorizing charcoal). The mixture is filtered and the filtrate is concentrated and then crystallized to give 17α,20,20,21-bis(methylenedioxy) - 11β - hydroxy - 16α-methyl-2'-(p-tolyl)-4,6-pregnadieno-[3,2-c]pyrazole.

Alternately, a mixture of 1'-(p-tolyl)- and 2'-(p-tolyl)-17α,20,20,21-bis(methylenedioxy)-11β - hydroxy-4,6-pregnadieno-[3,2-c]pyrazole is prepared by heating 17α,20,20,-21-bis(methylenedioxy)-11β - hydroxy-2-hydroxymethylene-16α-methyl-4,6-pregnadiene-3-one with methanol in the presence of p-toluenesulfonic acid to form the 17α,-20,20,21-bis(methylenedioxy) - 11β-hydroxy-2-methoxymethylene-16α-methyl-4,6-pregnadiene-3-one, and then reacting the latter compound with p-tolylhydrazine following the detailed procedures given in Example 10, but using p-tolylhydrazine instead of phenylhydrazine. The components of the mixture are separated by chromatography.

A 13 mg. aliquot of the 2'-,p-tolyl)-17α,20,20,21-bis(methylenedioxy)-11β - hydroxy-16α-methyl-4,6-pregnadieno-[3,2-c]pyrazole is heated on a steam bath with 1 ml. of a 60% aqueous solution of formic acid for about 30 minutes. The mixture is taken to dryness, water is added and the product is filtered off to give 11β,17α,21-trihydroxy-16α-methyl-20-oxo-2'-(p-tolyl) - 4,6- - pregnadieno-[3,2-c]pyrazole.

The 11β,17α,21-trihydroxy - 16α-methyl-20-oxo-2'-(p-tolyl)-4,6-pregnadieno-[3,2-c] pyrazole is treated with a mixture of 1.5 ml. of pyridine and 1.5 ml. of acetic anhydride and the mixture is allowed to stand at room temperature overnight. The solvents are removed in vacuo, water is added and the 11β,17α,21-trihydroxy-16α-methyl-20-oxo-2'-(p-tolyl)-4,6 - pregnadieno-[3,2-c]pyrazole 21-acetate is removed by filtration. After drying, the compound is dissolved in methylene chloride, a few drops of 2.5 N HCl are added and the mixture is taken to dryness. The resulting 11β,17α,21-trihydroxy-16α-methyl-20-oxo-4,6-pregnadieno-[3,2-c]pyrazole 21-acetate hydrochloride is soluble in methylene chloride and can be crystallized from acetone.

In accordance with the above procedure, but adding an equivalent amount of sulfuric acid, chloric acid, perchloric acid, picric acid or trichloroacetic acid in place of the hydrochloric acid the corresponding sulfate, chlorate, perchlorate, picrate or trichloroacetate salt is formed.

The 11β,17α,21-trihydroxy-16α-methyl - 20 - oxo-2'-p-tolyl-4,6-pregnadieno-[3,2-c]pyrazole is converted into its 21-acetate, the 11β,17α-dihydroxy-16α-methyl-20-oxo-2'-p-tolyl-4,6-pregnadieno-[3,2-c]pyrazole, and the 21-fluoro-11β,17α-dihydroxy - 16α-methyl - 20 - oxo-2'-p-tolyl-4,6-pregnadieno-[3,2-c pyrazole following the detailed procedures given in Example 10 for the corresponding 2'-phenyl-derivatives.

In accordance with the above procedures beginning with the 2' - (p - tolyl)-17α,20,20,21-bis(methylenedioxy)-11β-hydroxy-16α-methyl-4,6-pregnadieno-[3,2-c]pyrazole, but using the 1'-(p-tolyl)-derivative in place of the 2'-(p-tolyl)-derivative, there are obtained the corresponding 1'-p-tolyl-compounds.

In accordance with all of the above procedures, but starting with the 17α,20,20,21-bis(methylenedioxy)-2-hydroxymethylene-4,6-pregnadiene-derivative which is obtained from each of the starting materials which are listed in columns 2–4, there are obtained the corresponding 1'-(p-tolyl)- and 2'-(p-tolyl)-derivatives.

Example 12

To 223 mg. of 17α,20,20,21-bis(methylenedioxy)-11β-hydroxy - 2 - hydroxymethylene-16α-methyl-4,6-pregnadiene-3-one (Example 4) in 3 ml. of absolute ethanol is added 49.2 mg. of sodium acetate, and then 105 mg. of p-methoxyphenylhydrazine hydrochloride. The reaction mixture is refluxed for 5 minutes, at which time it turns dark. The product is filtered and taken to dryness. The residue is dissolved in ether, filtered and then stirred with an equal weight of Darco G–60 (a decolorizing charcoal). The filtrate is reduced to a volume of 1 cc. Petroleum ether is then added and the product is filtered off, to afford a solid which has as its major component the bis-(methylenedioxy) - 11β - hydroxy-16α-methyl-2'-(p-methoxyphenyl)-4,6-pregnadieno-[3,2-c]pyrazole.

Alternately, a mixture of 1'-(p-methoxyphenyl)- and the 2' - (p-methoxyphenyl)-17α,20,20,21-bis(methylenedioxy) - 11β - hydroxy-4,6-pregnadieno-[3,2-c]pyrazole is prepared by heating 17α,20,20,21-bis(methylenedioxy)-11β - hydroxy-2-hydroxymethylene-16α-methyl-4,6-pregnadiene-3-one with methanol in the presence of p-toluenesulfonic acid to form the 17α,20,20,21-bis(methylenedioxy) - 11β - hydroxy-2-methoxymethylene-16α-methyl-4,6-pregnadiene-3-one, and then reacting the latter compound with p-methoxyphenylhydrazine following the detailed procedures given in Example 10, but using p-methoxyphenyl-hydrazine for phenylhydrazine. The components of the mixture are separated by chromatography.

A 70 mg. aliquot of 17α,20,20,21-bis(methylenedioxy)-11β - hydroxy - 16α - methyl-2'-(p-methoxyphenyl)-4,6-pregnadieno-[3,2-c]pyrazole is heated on a steam bath with 7 ml. of a 60% aqueous solution of formic acid for about 40 minutes under nitrogen. The mixture is taken to dryness, water is added and the product is filtered. The solid is purified by dissolving in acetone and adding 50 mg. of Nuchar C–1000–N (a decolorizing charcoal), and then filtering. Petroleum ether is added and the product is crystallized to give 11β-17α,21-trihydroxy-16α-methyl - 20 - oxo-2'-(p-methoxyphenyl)-4,6-pregnadieno-[3,2-c]pyrazole.

The 11β,17α - 21-trihydroxy-16α-methyl-20-oxo-2'-(p-methoxyphenyl) - 4,6 - pregnadieno-[3,2-c]pyrazole is treated with a mixture of 1.5 ml. of pyridine and 1.5 ml. of acetic anhydride and the mixture is allowed to stand at room temperature overnight. The solvents are removed in vacuo, water is added and the 11β,17α,21-trihydroxy - 16α - methyl-20-oxo-2'-(p-methoxyphenyl)-4,6-pregnadieno-[3,2-c]pyrazole 21-acetate is removed by filtration. After drying, the compound is dissolved in methylene chloride, a few drops of 2.5 N HCl are added and the mixture is taken to dryness to give 11β,17α,21-trihydroxy - 16α - methyl-20-oxo-2'-(p-methoxyphenyl)-4,6-pregnadieno-[3,2-c]pyrazole 21-acetate hydrochloride.

The 11β,17α,21-trihydroxy-16α-methyl-2'-(p-methoxyphenyl) - 20 - oxo-4,6-pregnadieno-[3,2-c]pyrazole is converted into the 21-acetate, the 11β,17α-dihydroxy-16α-methyl - 2' - (p-methoxyphenyl)-20-oxo-4,6-pregnadieno-[3,2-c]pyrazole and the 21-fluoro-11β,17α-dihydroxy-16α-methyl - 2' - p - methoxyphenyl-20-oxo-4,6-pregnadieno-[3,2-c]pyrazole following the detailed procedures given in Example 10 for the corresponding 2'-phenyl-derivatives.

In accordance with the above procedures beginning with the 2'-(p-methoxyphenyl)-17α,20,20,21-bis(methylenedioxy) - 11β - hydroxy - 16α-methyl-4,6-pregnadieno-[3,2-c]pyrazole, but using the 1'-(p-methoxyphenyl)-derivative in place of the 2'-(p-methoxyphenyl)-derivative, there are obtained the corresponding 1'-(p-methoxyphenyl)-compounds.

In accordance with the above procedures, but starting with the 17α,20,20,21 - bis(methylenedioxy)-2-hydroxymethylene-4,6-pregnadiene derivative which is obtained from each of the starting materials which are listed in columns 2–4, there are obtained the corresponding 1'-(p-methoxyphenyl)-2'-(p-methoxyphenyl)-derivatives.

Example 13

A 111.5 mg. sample of 17α,20,20,21-bis(methylenedioxy) - 11β - hydroxy-2-hydroxymethyl-16α-methyl-4,6-pregnadiene-3-one is suspended in 2.5 ml. of ethanol and treated with 24.5 mg. of sodium acetate, followed with the addition of 48.5 mg. of p-fluorophenylhydrazine hydrochloride. The air in the system is replaced with nitrogen and the mixture is quickly brought to reflux temperature. After refluxing for one hour the mixture is taken to dryness. The residue is dissolved in ether, the ether layer is treated three times with 2.5 N hydrochloric acid, then three times with 2.5 N sodium hydroxide, and finally with water. The ether layer is dried over magnesium sulfate, filtered and concentrated to dryness in vacuo to give a residue which has as its major component the 17α,20,20,21-bis(methylenedioxy)-2'-p-fluorophenyl-11β - hydroxy - 16α - methyl-4,6-pregnadieno-[3,2-c]-pyrazole. The latter compound is recovered by dissolving the reaction mixture in methanol and then recrystallizing.

Alternately, a mixture of the 1'-(p-fluorophenyl)- and the 2' - (p - fluorophenyl)-17α,20,20,21-bis(methylenedioxy) - 11β - hydroxy - 16α - methyl-4,6-pregnadieno-[3,2-c]pyrazole is prepared by the following route: A mixture of 1 gram of 17α,20,20,21-bis(methylenedioxy)-11β-hydroxy-2-hydroxymethylene-16α-methyl-4,6-pregnadiene-3-one, 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated in vacuo. The 17α,20,20,21-bis(methylenedioxy) -11β-hydroxy-2-methoxymethylene-16α-methyl-4,6-pregnadiene-3-one is obtained by direct crystallization or by chromatography on acid-washed alumina and elution with ether:chloroform mixtures.

A mixture of 500 mg. of 17α,20,20,21-bis(methylenedioxy) - 11β - hydroxy-2-methoxymethylene-16α-methyl-4,6-pregnadiene-3-one, 100 ml. of ethanol, and 1 ml. of p-fluorophenylhydrazine is heated under nitrogen until dissolved, and then allowed to stand under nitrogen at room temperature overnight. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina. Elution with benzene affords a product which on recrystallization from a mixture of benzene and ethyl acetate affords the 17α,20,20,21 - bis(methylenedioxy) - 11β-hydroxy - 16α-methyl-1'-fluorophenyl-4,6-pregnadieno-[3,2-c]pyrazole. Further elution with a mixture of 1:1 ether:petroleum ether, and crystallization from benzene, affords the 17α,20,20,21-bis(methylenedioxy)-16α-methyl-2'-(p-fluorophenyl)-4,6-pregnadieno-[3,2-c]pyrazole.

A 70 mg. aliquot of 17α,20,20,21-bis(methylenedioxy)-2' - (p - fluorophenyl)-11β-hydroxy-16α-methyl-4,6-pregnadieno-[3,2-c]pyrazole is heated on a steam bath with 2 ml. of a 60% solution of formic acid for 35 minutes.

The excess reagent is removed in vacuo using a water bath at about 50° C. The residue is thoroughly washed with water and then dried at 80° C. to give 61.1 mg. of residue. The crude product is dissolved in 3 ml. of spectral grade methanol and allowed to react with 0.5 ml. of a 0.1 N solution of sodium methoxide in methanol at room temperature for 10 minutes. The product is neutralized with acetic acid. The mixture is then taken to dryness and washed thoroughly with water, filtered and dried to constant weight to give 11β,17α,21-trihydroxy-2' - (p-fluorophenyl)-16α methyl-20-oxo-4,6-pregnadieno-[3,2-c]pyrazole.

To a solution of 100 mg. of 11β,17α,21-trihydroxy-2'-(p - fluorophenyl) - 16α-methyl-20-oxo-4,6-pregnadieno-[3,2-c]pyrazole in 2 ml. of pyridine is added one milliequivalent of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. in vacuo to afford 11β,17α,21-trihydroxy - 2' - (p-fluorophenyl)-16α-methyl-20-oxo-4,6-pregnadieno-[3,2-c]pyrazole 21-acetate which is isolated by the addition of water and filtration.

In accordance with the above procedure, but using an equivalent quantity of another acylating agent in place of acetic anhydride, there is obtained the corresponding 21-acylate.

To a solution of 85 mg. of 2'-(p-fluorophenyl)-11β,17α,21 - trihydroxy - 16α - methyl-20-oxo-4,6-pregnadieno-[3,2-c]pyrazole in 0.5 ml. of pyridine, cooled to 0° C., is added 0.015 ml. of methane sulfonyl chloride. The resulting mixture is allowed to stand at a temperature of approximately 0° C. for a period of approximately 1 hour. Water is then added to the reaction mixture and the crystalline precipitate which forms is recovered by filtration, washed with water, and dried to give 2'-(p-fluorophenyl) - 11β,17α,21-trihydroxy-16α-methyl-20-oxo-4,6-pregnadieno-[3,2-c]pyrazole 21-mesylate.

To 180 mg. of 2'-(p-fluorophenyl)-11β,17α,21-trihydroxy - 16α-methyl-20-oxo-4,6-pregnadieno-[3,2-c] - pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered by filtration, washed with water, and dried to give 2'-(p-fluorophenyl)-11β,17α-dihydroxy - 21-iodo-16α-methyl-20-oxo-4,6-pregnadieno-[3,2-c]pyrazole.

The 2' - (p-fluorophenyl)-11β,17α-dihydroxy-21-iodo-16α-methyl-20-oxo-4,6-pregnadienol[3,2-c]pyrazole is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and the crystalline material which separates is recovered by filtration. The product is washed with water, dried and recrystallized from ethyl acetate to give 2'-(p-fluorophenyl)-11β,17α-dihydroxy-16α-methyl-20-oxo-4,6-pregnadieno-[3,2-c]-pyrazole.

To a solution of 62 mg. of 2'-(p-fluorophenyl)-11β,17α,21 - trihydroxy-16α-methyl-20-oxo-4,6-pregnadieno-[3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of 2'-(p-fluorophenyl) - 17α,21 - epoxy-11β-hydroxy-16α-methyl-20-oxo-4,6-pregnadieno-[3,2-c]pyrazole and 2'-(p-fluorophenyl) - 21 - fluoro-11β,17α-dihydroxy-16α-methyl-20-oxo-4,6-pregnadieno-[3,2-c]pyrazole which compounds are separated by partition chromatography.

In accordance with the above procedures beginning with the 2' - (p-fluorophenyl)-17α,20,20,21-bis(methylenedioxy) - 11β-hydroxy-6α-methyl-4,6-pregnadieno-[3,2-c]pyrazole, but using the 1'-(p-fluorophenyl)-derivative in place of the 2'-(p-fluorophenyl)-derivative, there are obtained the corresponding 1'-(p-fluorophenyl)-compounds.

In accordance with all of the above procedures, but starting with the 17α,20,20,21-bis(methylenedioxy)-2-hydroxymethylene-4,6-pregnadiene derivative which is obtained from each of the starting materials which are listed in columns 2–4, there are obtained the corresponding 1'-(p-fluorophenyl)-and 2'-(p-fluorophenyl)-derivatives.

In accordance with all of the above procedures, but reacting the 17α,20,20,21 - bis(methylenedioxy) - 11β - hydroxy - 2 - hydroxymethylene - 16α - methyl-4,6-pregnadiene-3-one starting materials with p-chlorophenylhydrazine hydrochloride instead of p-fluorophenylhydrazine hydrochloride the corresponding 2'-(p-chlorophenyl)-derivatives are obtained.

*Example 14*

To 200 mg. of 17α,20,20,21-bis(methylenedioxy)-11β-hydroxy - 2 - hydroxymethylene-16α-methyl-4,6-pregnadiene-3-one (Example 4) in 7 cc. of absolute ethanol is added 82 mg. of sodium acetate and then 109 g. of benzylhydrazine oxalate. The mixture is refluxed under nitrogen for one hour. The insolubles are removed by filtration. The filtrate is taken to dryness and the residue is dissolved in 3 cc. of ether and the ether solution is washed successively with 2% aqueous sodium hydroxide and then with water to neutrality. The ether solution is then dried over magnesium sulfate, filtered and taken to dryness to afford a solid which is predominantly the N-benzyl-17α, 20,20,21 - bis(methylenedioxy) - 11β - hydroxy - 4,6 -pregnadieno-[3,2-c]pyrazole.

Alternately, a mixture of 1'-benzyl and the 2'-benzyl-17α,20,20,21-bis(methylenedioxy)-11β-hydroxy-4,6 - pregnadieno-[3,2-c]pyrazole is prepared by heating 17α,20,20,-21-bis(methylenedioxy) - 11β - hydroxy-2-hydroxymethylene-16α-methyl-4,6-pregnadiene-3-one with methanol in the presence of p-toluenesulfonic acid to form the 17α,20, 20,21 - bis(methylenedioxy) - 11β - hydroxy - 2 - methoxymethylene-16α-methyl-4,6-pregnadiene-3-one, and then reacting the latter compound with benzylhydrazine following the detailed procedures given in Example 10, but using benzylhydrazine instead of phenylhydrazine. The components of the mixture are separated by chromatography.

A 150 mg. aliquot of the 2'-benzyl-17α,20,20,21-bis-(methylenedioxy) - 11β - hydroxy - 16α - methyl-4,6-pregnadieno-[3,2-c]pyrazole is heated under nitrogen with 5 cc. of a 60% aqueous solution of formic acid for about 40 minutes. The mixture is taken to dryness and water is then added. The product is extracted with chloroform, and the chloroform solution is washed with a saturated aqueous sodium chloride solution, 5% aqueous sodium bicarbonate solution and then with water. The chloroform solution is dried over magnesium sulfate and then taken to dryness to give a residue of 76 mg. This is taken up in ether containing a little methanol, stirred with 75 mg. of Darco G–60 (a decolorizing charcoal), filtered and taken to dryness to give 2'-benzyl-11β,17α,21-trihydroxy-16α-methyl-20-oxo-4,6-pregnadieno-[3,2-c]pyrazole.

The 2'-benzyl - 11β,17α,21 - trihydroxy-16α-methyl-20-oxo-4,6-pregnadieno-[3,2-c]pyrazole is treated with a mixture of 1.5 ml. of pyridine and 1.5 ml. of acetic anhydride and the mixture is allowed to stand at room temperature overnight. The solvents are removed in vacuo, water is added and the 2' - benzyl - 11β,17α,21 - trihydroxy - 16α- methyl-20-oxo-4,6-pregnadieno-[3,2-c]pyrazole 21-acetate is removed by filtration.

The 2' - benzyl -11β,17α,21 - trihydroxy - 16α - methyl-20 - oxo - 4,6 - pregnadieno - [3,2 - c]pyrazole is converted into the 2' - benzyl - 11β,17α,dihydroxy - 16α - methyl-20 - oxo - 4,6 - pregnadieno - [3,2 - c]pyrazole and the 2'-benzyl - 21 - fluoro - 11β,17α - dihydroxy - 16α - methyl-20 - oxo - 4,6 - pregnadieno - [3,2 - c]pyrazole following the detailed procedures given in Example 10 for the corresponding 2'-phenyl-derivatives.

In accordance with the above procedures beginning with the 2' - benzyl - 17α,20,20,21 - bis(methylenedioxy) - 11β-hydroxy - 16α - methyl - 4,6 - pregnadieno - [3,2 - c]pyrazole, but using the 1' - benzyl - derivative in place of the 2'-benzyl-derivative, there are obtained the corresponding 1'-benzyl-compounds.

In accordance with the above procedures, but using other aralkylhydrazines, for example, phenylethylenehydrazine, in place of benzylhydrazine, there are obtained the corresponding 1'- and 2'-aralkyl derivatives.

In accordance with all of the above procedures, but starting with the 17α,20,20,21-bis(methylenedioxy)-2-hydroxymethylene-4,6-pregnadiene-derivative which is obtained from each of the starting materials listed in columns 2-4, there are obtained the corresponding 1' and 2'-aralkyl-derivatives.

*Example 15*

A mixture of 71.6 mg. of 17α,20,20,21-bis(methylenedioxy) - 9α - fluoro - 2 - hydroxymethylene - 16α - methyl-4,6 - pregnadiene - 3,11 - dione (Example 6) and 0.02 ml. of phenylhydrazine is refluxed in 0.97 ml. of absolute ethanol for one hour. A crystalline product separates in the hot. The reaction mixture is cooled and filtered. The product is then washed with cold methanol to yield as a major component 17α,20,20,21 - bis(methylenedioxy)-9α-fluoro-16α - methyl - 11 - oxo - 2' - phenyl - 4,6 - pregnadieno - [3,2-c]pyrazole.

A 29.5 mg. aliquot of the above material is heated under nitrogen on a steam bath for one hour and 5 minutes under nitrogen with 12 ml. of a 60% aqueous solution of formic acid. The product is taken to dryness, water is added and the product is filtered off to give 9α-fluoro-17α-21 - dihydroxy - 16α - methyl - 11,20 - dioxo - 2' - phenyl-4,6 - pregnadieno - [3,2-c]pyrazole.

To 15 mg. of 17α,20,20,21 - bis(methylenedioxy) - 9α - fluoro - 16α - methyl - 11 - oxo - 2' - phenyl - 4,6 - pregnadieno - [3,2-c] - pyrazole dissolved in methylene chloride is added 0.03 cc. of a reagent prepared by dissolving 0.55 ml. of triethylamine in 1.45 ml. of isopropyl alcohol, and then 2.5 ml. of a solution prepared by adding 1 g. of sodium borohyride to 100 ml. of isopropyl alcohol and filtering off insolubles. One drop of water is added and the mixture is then allowed to stand overnight at room temperature. The excess sodium borohyride is decomposed with acid and the residue is then washed with water to afford 17α,20,20,21 - bis(methylenedioxy) - 9α - fluoro-11β - hydroxy - 16α - methyl - 2' - phenyl - 4,6 - pregnadieno-[3,2-c]pyrazole.

A 9.4 mg. aliquot of the above material is heated under nitrogen on a steam bath for 35 minutes with 6 ml. of a 60% aqueous solution of formic acid. The product is taken to dryness, water is added and the product is filtered off to give 9α - fluoro - 11β,17α' - 21 - trihydroxy - 16α-methyl - 20 - oxo - 2' - phenyl - 4,6 - pregnadieno-[3,2-c]-pyrazole.

Various changes and modifications may be made in carrying out the present invention without departing from the spirit and scope thereof. Insofar as these changes and modifications are within the purview of the annexed claim, they are to be considered as part of our invention.

We claim:

A compound selected from the group of compounds having structural formulas A and B:

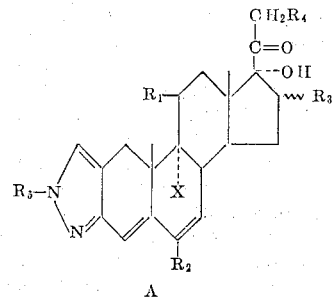

A

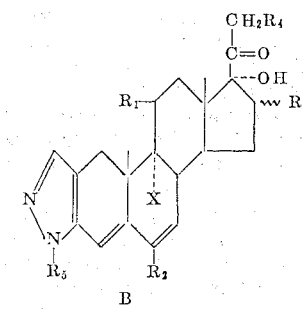

B wherein $R_1$ is a member of the group consisting of β-halogen, β-hydroxy and keto, but β-halogen is present at $R_1$ only when X is halogen, $R_2$ is a member of the group consisting of hydrogen, fluoro and methyl, $R_3$ is a member of the group consisting of hydrogen, α-methyl, β-methyl and methylene when $R_1$ is β-halogen, but $R_3$ must be methylene when $R_1$ is β-hydroxy or keto, $R_4$ is a member of the group consisting of hydrogen, hydroxy, lower hydrocarbon carboxylic acyloxy, fluoro, iodo, the dihydrogen phosphate and the alkali metal salts of said dihydrogen phosphate, and the methylsulfonyloxy-radical, $R_5$ is a member of the group consisting of hydrogen, alkyl, aralkyl, aryl and lower hydrocarbon carboxylic acyl, and X is a member of the group consisting of hydrogen and halogen, and salts of the foregoing compounds.

References Cited by the Examiner

Sterling Drug Inc. (Belgium), 577,027, Sept. 24, 1959, pages 1–10, 39–41, 54 and 55.

LEWIS GOTTS, *Primary Examiner.*

H. A. FRENCH, *Assistant Examiner.*